US012335961B2

(12) United States Patent
Sridharan et al.

(10) Patent No.: US 12,335,961 B2
(45) Date of Patent: Jun. 17, 2025

(54) RESOURCES FOR UPLINK CONTROL INFORMATION MULTIPLEXING IN AN ABSENCE OF DEMODULATION REFERENCE SIGNALS

(71) Applicant: QUALCOMM Incorporated, San Diego, CA (US)

(72) Inventors: Gokul Sridharan, Sunnyvale, CA (US); Mahmoud Taherzadeh Boroujeni, San Diego, CA (US); Hung Dinh Ly, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 17/478,813

(22) Filed: Sep. 17, 2021

(65) Prior Publication Data

US 2023/0090447 A1 Mar. 23, 2023

(51) Int. Cl.
*H04W 72/23* (2023.01)
*H04L 1/1867* (2023.01)
*H04L 5/00* (2006.01)
*H04W 72/0446* (2023.01)
*H04W 72/1268* (2023.01)

(52) U.S. Cl.
CPC ......... *H04W 72/23* (2023.01); *H04L 1/1896* (2013.01); *H04L 5/0051* (2013.01); *H04W 72/0446* (2013.01); *H04W 72/1268* (2013.01)

(58) Field of Classification Search
CPC ......... H04W 72/0446; H04W 72/1268; H04W 72/23; H04L 1/08; H04L 1/1896; H04L 5/0051; H04L 5/0053
See application file for complete search history.

(56) References Cited

U.S. PATENT DOCUMENTS

| 2020/0221433 | A1* | 7/2020 | Park | H04L 5/14 |
| 2020/0245320 | A1* | 7/2020 | Yoshioka | H04L 5/0044 |
| 2022/0408420 | A1* | 12/2022 | Li | H04W 72/044 |
| 2023/0049739 | A1* | 2/2023 | Yang | H04L 5/0044 |

\* cited by examiner

*Primary Examiner* — Marcus Smith
*Assistant Examiner* — Zhaohui Yang
(74) *Attorney, Agent, or Firm* — Holland & Hart LLP/Qualcomm

(57) ABSTRACT

Methods, systems, and devices for wireless communications are described. Generally, the described techniques provide for identifying resources in which to transmit feedback information in a slot in an absence of demodulation reference signals (DMRSs) in the slot. In some aspects, a user equipment (UE) may identify a symbol in which to transmit feedback information in a slot in an absence of DMRSs in the slot based on a reference symbol. The reference symbol may be a symbol in the slot previously configured to include DMRSs, or a symbol in a previous slot configured to include DMRSs, or a first symbol in the slot, or a first symbol of a set of symbols in the slot allocated for an uplink data transmission in the slot. A relation between the symbol in which to transmit the feedback information in the slot and the reference symbol may be defined at the UE.

24 Claims, 17 Drawing Sheets

205-a  205-b  205-c  205-d 200-a 205-e  205-f  205-g 200-b

210 — Uplink transmissions
215 — DMRS

405 — Uplink data and control information
410 — Feedback information
415 — DMRS

400

505 — ▨ Feedback information
510 — ▣ DMRSs

RESOURCES FOR UPLINK CONTROL INFORMATION MULTIPLEXING IN AN ABSENCE OF DEMODULATION REFERENCE SIGNALS

FIELD OF TECHNOLOGY

The following relates to wireless communications, including resources for uplink control information multiplexing in an absence of demodulation reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may transmit demodulation reference signals (DMRSs) to a UE to allow the UE to perform channel estimation and identify suitable parameters for communicating with the base station. In some cases, the UE may support DMRS bundling, where the UE may use DMRSs across multiple slots to perform channel estimation. Improved techniques for supporting DMRS bundling at a UE may be desirable.

SUMMARY

The described techniques relate to improved methods, systems, devices, and apparatuses that support resources for uplink control information multiplexing in an absence of demodulation reference signals (DMRSs). Generally, the described techniques provide for identifying resources in which to transmit feedback information in a slot in an absence of DMRSs in the slot. In some aspects, a user equipment (UE) may identify a symbol in which to transmit the feedback information in a slot in an absence of DMRSs in the slot based on a reference symbol. The reference symbol may be a symbol in the slot previously configured to include DMRSs, or a symbol in a previous slot configured to include DMRSs, or a first symbol in the slot, or a first symbol of a set of symbols in the slot allocated for an uplink data transmission in the slot. A relation between the symbol in which to transmit the feedback information in the slot and the reference symbol may be defined at the UE.

A method for wireless communication at a UE is described. The method may include receiving, from a base station, downlink control information scheduling uplink data transmissions from the UE to the base station in a set of multiple slots, wherein the uplink data transmissions comprise repeated uplink data transmissions, and wherein the plurality of slots includes, at least, a first slot in which a DMRS is present in a physical uplink shared channel (PUSCH) and a second slot in which the DMRS is absent from the PUSCH, and wherein the DMRS facilitates cross-slot channel estimation for the uplink data transmissions in slots of the plurality of slots, determining that uplink control information including feedback information is to be multiplexed with an uplink data transmission of the scheduled uplink data transmissions in the second slot, identifying a symbol for transmission of the feedback information in the second slot based on an absence of the DMRS in the second slot, and transmitting the feedback information in the identified symbol.

An apparatus for wireless communication at a UE is described. The apparatus may include a processor, memory coupled with the processor, and instructions stored in the memory. The instructions may be executable by the processor to cause the apparatus to receive, from a base station, downlink control information scheduling uplink data transmissions from the UE to the base station in a set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots, determine that uplink control information including feedback information is to be multiplexed with an uplink data transmission of the scheduled uplink data transmissions in the second slot, identify a symbol for transmission of the feedback information in the second slot based on an absence of the DMRS in the second slot, and transmit the feedback information in the identified symbol.

Another apparatus for wireless communication at a UE is described. The apparatus may include means for receiving, from a base station, downlink control information scheduling uplink data transmissions from the UE to the base station in a set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots, means for determining that uplink control information including feedback information is to be multiplexed with an uplink data transmission of the scheduled uplink data transmissions in the second slot, means for identifying a symbol for transmission of the feedback information in the second slot based on an absence of the DMRS in the second slot, and means for transmitting the feedback information in the identified symbol.

A non-transitory computer-readable medium storing code for wireless communication at a UE is described. The code may include instructions executable by a processor to receive, from a base station, downlink control information scheduling uplink data transmissions from the UE to the base station in a set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots, determine that uplink control information including feedback information is to be multiplexed with an uplink data transmission of the scheduled uplink data transmissions in the second slot, identify a symbol for transmission of the feedback information in the second slot based on an absence of the DMRS in the second slot, and transmit the feedback information in the identified symbol.

In some examples of the method, apparatuses, and non-transitory computer-readable medium described herein, identifying the symbol for transmission of the feedback information in the second slot may include operations, features, means, or instructions for identifying the symbol for transmission of the feedback information in the second slot based on a reference symbol. In some examples of the method, apparatuses, and non-transitory computer-readable medium described herein, the reference symbol may correspond to a location of the DMRS in the first slot, or is in the location of the second slot that corresponds to a timing of the DMRS in the first slot, or is a first symbol in the second slot, or is a first symbol of a set of symbols in the second slot allocated for the uplink data transmission. In some examples of the method, apparatuses, and non-transitory computer-readable medium described herein, a relation between the identified symbol for transmission of the feedback information in the second slot and the reference symbol may be defined at the UE.

Some examples of the method, apparatuses, and non-transitory computer-readable medium described herein may further include operations, features, means, or instructions for receiving a time-domain resource allocation indicating a set of symbols in the second slot allocated for the uplink data transmission, where identifying the symbol for transmission of the feedback information in the second slot may be based on the set of symbols in the second slot allocated for the uplink data transmission. In some examples of the method, apparatuses, and non-transitory computer-readable medium described herein, the symbol identified for transmission of the feedback information in the second slot may be a first symbol in the set of symbols allocated for the uplink data transmission.

Some examples of the method, apparatuses, and non-transitory computer-readable medium described herein may further include operations, features, means, or instructions for identifying a set of multiple options for identifying the symbol for transmission of the feedback information in the second slot and receiving, from the base station in the downlink control information, an indication of an option of the set of multiple options to use for identifying the symbol for transmission of the feedback information in the second slot. In some examples of the method, apparatuses, and non-transitory computer-readable medium described herein, the set of multiple options includes options for which reference symbol the UE may be to use to identify the symbol for transmission of the feedback information in the second slot.

Some examples of the method, apparatuses, and non-transitory computer-readable medium described herein may further include operations, features, means, or instructions for identifying one or more resource elements in the identified symbol on which to transmit the feedback information based on a quantity of tones in a resource block allocated for transmitting the feedback information. In some examples of the method, apparatuses, and non-transitory computer-readable medium described herein, identifying the symbol for transmission of the feedback information in the second slot may include operations, features, means, or instructions for identifying the symbol for transmission of the feedback information in the second slot based on a size of a payload of the feedback information. In some examples of the method, apparatuses, and non-transitory computer-readable medium described herein, the absence of the demodulation reference signal in the second slot may be due to the UE using demodulation reference signal bundling across the set of multiple slots. In some examples of the method, apparatuses, and non-transitory computer-readable medium described herein, the symbol for reception of the feedback information differs between the first slot and the second slot.

A method for wireless communication at a base station is described. The method may include transmitting, to a UE, downlink control information scheduling uplink data transmissions from the UE to the base station in a set of multiple slots, receiving, from the UE, uplink control information including feedback information from the UE multiplexed with an uplink data transmission of the scheduled uplink data transmissions in a slot of the set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots, identifying a symbol including the feedback information in the slot based on an absence of the DMRS in the second slot, and decoding the feedback information in the identified symbol.

An apparatus for wireless communication at a base station is described. The apparatus may include a processor, memory coupled with the processor, and instructions stored in the memory. The instructions may be executable by the processor to cause the apparatus to transmit, to a UE, downlink control information scheduling uplink data transmissions from the UE to the base station in a set of multiple slots, receive, from the UE, uplink control information including feedback information from the UE multiplexed with an uplink data transmission of the scheduled uplink data transmissions in a slot of the set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots, identify a symbol including the feedback information in the slot based on an absence of the DMRS in the second slot, and decode the feedback information in the identified symbol.

Another apparatus for wireless communication at a base station is described. The apparatus may include means for transmitting, to a UE, downlink control information scheduling uplink data transmissions from the UE to the base station in a set of multiple slots, means for receiving, from the UE, uplink control information including feedback information from the UE multiplexed with an uplink data transmission of the scheduled uplink data transmissions in a slot of the set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots, means for identifying a symbol including the feedback information in the slot based on an absence of the DMRS in the second slot, and means for decoding the feedback information in the identified symbol.

A non-transitory computer-readable medium storing code for wireless communication at a base station is described. The code may include instructions executable by a processor to transmit, to a UE, downlink control information scheduling uplink data transmissions from the UE to the base station in a set of multiple slots, receive, from the UE, uplink control information including feedback information from the UE multiplexed with an uplink data transmission of the scheduled uplink data transmissions in a slot of the set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots, identify a symbol including the feedback information in the slot based on an absence of the DMRS in the second slot, and decode the feedback information in the identified symbol.

In some examples of the method, apparatuses, and non-transitory computer-readable medium described herein, identifying the symbol including the feedback information in the slot may include operations, features, means, or instructions for identifying the symbol including the feedback information in the second slot based on a reference symbol. In some examples of the method, apparatuses, and non-transitory computer-readable medium described herein, the reference symbol may correspond to a location of the DMRS in the first slot, or is in the location of the second slot that corresponds to a timing of the DMRS in the first slot, or is a first symbol in the second slot, or is a first symbol of a set of symbols in the second slot allocated for the uplink data transmission. In some examples of the method, apparatuses, and non-transitory computer-readable medium described herein, a relation between the identified symbol including the feedback information in the second slot and the reference symbol may be defined at the base station.

Some examples of the method, apparatuses, and non-transitory computer-readable medium described herein may further include operations, features, means, or instructions for transmitting a time-domain resource allocation indicating a set of symbols in the second slot allocated for the uplink data transmission, where identifying the symbol including the feedback information in the second slot may be based on the set of symbols in the second slot allocated for the uplink data transmission. In some examples of the method, apparatuses, and non-transitory computer-readable medium described herein, the symbol including the feedback information in the second slot may be a first symbol in the set of symbols allocated for the uplink data transmission.

Some examples of the method, apparatuses, and non-transitory computer-readable medium described herein may further include operations, features, means, or instructions for identifying a set of multiple options for identifying the symbol including the feedback information in the slot and transmitting, to the UE in the downlink control information, an indication of an option of the set of multiple options for the UE to use to identify the symbol for transmission of the feedback information in the second slot. In some examples of the method, apparatuses, and non-transitory computer-readable medium described herein, the set of multiple options includes options for which reference symbol the UE may be to use to identify the symbol for transmission of the feedback information in the second slot.

Some examples of the method, apparatuses, and non-transitory computer-readable medium described herein may further include operations, features, means, or instructions for identifying one or more resource elements in the identified symbol including the feedback information based on a quantity of tones in a resource block allocated for the feedback information. In some examples of the method, apparatuses, and non-transitory computer-readable medium described herein, identifying the symbol including the feedback information in the slot may include operations, features, means, or instructions for identifying the symbol including the feedback information in the second slot based on a size of a payload of the feedback information. In some examples of the method, apparatuses, and non-transitory computer-readable medium described herein, the absence of the demodulation reference signal in the second slot may be due to the UE using demodulation reference signal bundling across the set of multiple slots. In some examples of the method, apparatuses, and non-transitory computer-readable medium described herein, the symbol for reception of the feedback information differs between the first slot and the second slot.

DETAILED DESCRIPTION

In some wireless communications systems, a base station may transmit demodulation reference signals (DMRSs) to a user equipment (UE) to allow the UE to perform channel estimation and identify suitable parameters for communicating with the base station. In some cases, the base station may transmit DMRSs in each slot allocated for communications with the UE, and the UE may perform channel estimation for each slot based on the DMRSs received in the slot. In other cases, the UE may be configured to perform joint channel estimation across multiple slots, and the UE may perform the joint channel estimation using DMRSs received in multiple slots. The joint channel estimation across multiple slots may also be referred to as DMRS bundling.

If a UE is configured to use DMRS bundling and perform joint channel estimation across multiple slots, a base station may avoid transmitting DMRSs in one or more of the multiple slots (e.g., to free resources configured for DMRSs to be used for data or control information transmissions). In some cases, however, the UE may use the DMRSs in a slot as a reference to identify resources in which to transmit feedback information to the base station. That is, if the UE determines to multiplex feedback information with data in a slot, the UE may identify resources in which to transmit the feedback information in the slot based on a location of DMRSs in the slot. As such, if DMRSs is absent in a slot, the UE may be unable to identify resources in which to transmit the feedback information, which may be detrimental to communications between the UE and the base station in a wireless communications system.

As described herein, a wireless communications system may support efficient techniques for identifying resources in which to transmit feedback information in a slot in an absence of DMRSs in the slot. In some aspects, the UE may identify a symbol in which to transmit feedback information in a slot in an absence of DMRSs in the slot based on a reference symbol. The reference symbol may be a symbol in the slot previously configured to include DMRSs, or a symbol in a previous slot configured to include DMRSs, or a first symbol in the slot, or a first symbol of a set of symbols in the slot allocated for an uplink data transmission in the slot. A relation between the symbol in which to transmit the feedback information in the slot and the reference symbol may be defined at the UE.

Aspects of the disclosure are initially described in the context of wireless communications systems. Examples of processes and signaling exchanges that support resources for uplink control information multiplexing in an absence of DMRSs are then described. Aspects of the disclosure are further illustrated by and described with reference to apparatus diagrams, system diagrams, and flowcharts that relate to resources for uplink control information multiplexing in an absence of DMRSs.

Figure 1:
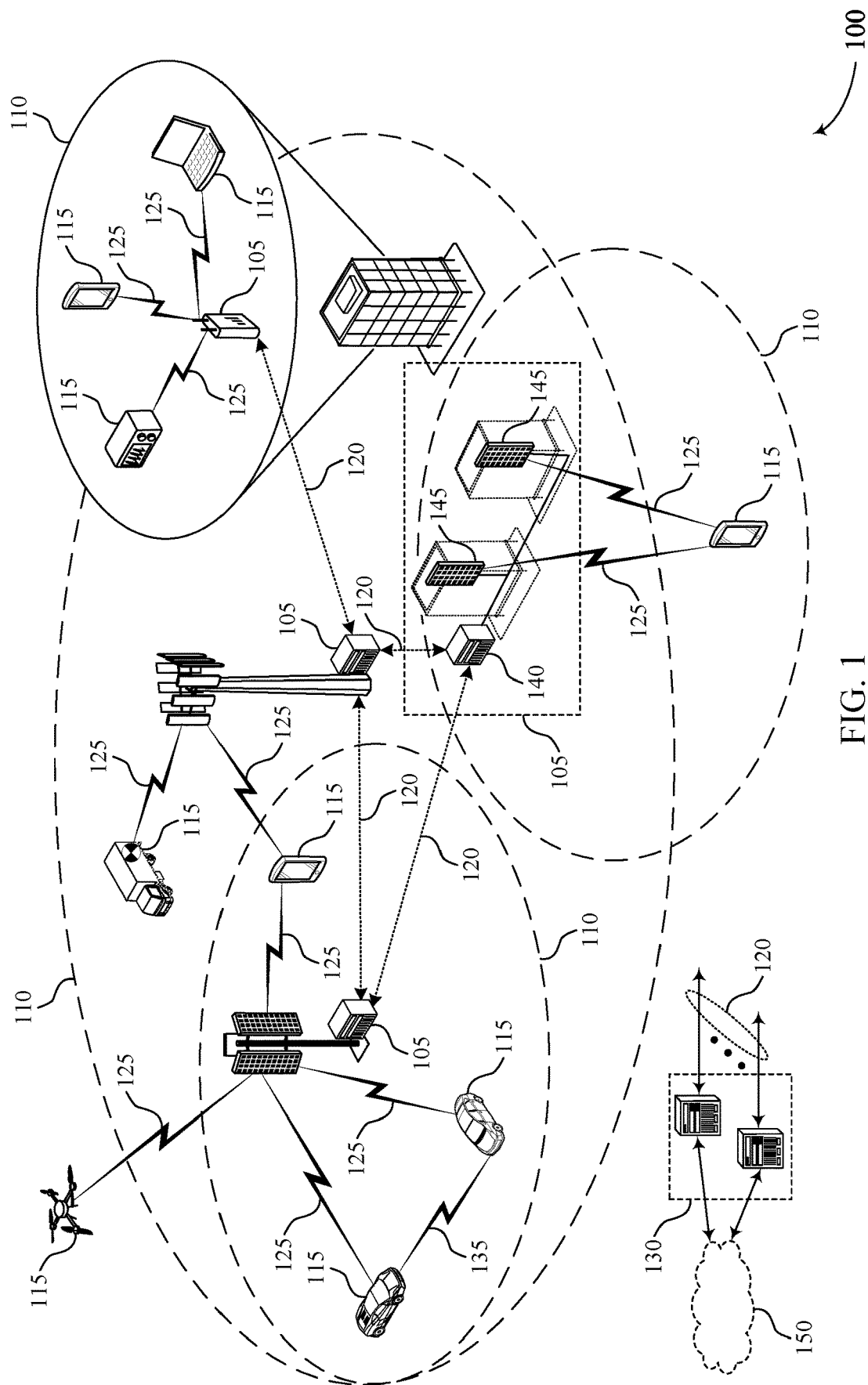
FIG. 1 illustrates an example of a wireless communications system that supports resources for uplink control information multiplexing in an absence of demodulation reference signals (DMRSs) in accordance with aspects of the present disclosure.

FIG. 1 illustrates an example of a wireless communications system 100 that supports resources for uplink control information multiplexing in an absence of DMRSs in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ feedback may be referred to as feedback information and may include an acknowledgment (ACK) indicating that a message is received successfully or a negative ACK (NACK) indicating that a device failed to receive or decode a message. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a base station 105 may transmit DMRSs to a UE 115 to allow the UE 115 to perform channel estimation and identify suitable parameters for communicating with the base station 105. In some cases, the base station 105 may transmit DMRSs in each slot allocated for communications with the UE 115, and the UE 115 may perform channel estimation for each slot based on the DMRSs received in the slot. In other cases, the UE 115 may be configured to perform joint channel estimation across multiple slots, and the UE 115 may perform the joint channel estimation using DMRSs received in the multiple slots. That is, joint channel estimation may refer to channel estimation using DMRSs across multiple slots. Joint channel estimation across multiple slots may also be referred to as DMRS bundling.

Joint channel estimation or DMRS bundling may be supported for PUSCH and PUCCH coverage enhancements. Joint channel estimation may leverage DMRS symbols from multiple slots to form a more reliable channel estimate. When relying on DMRSs across multiple slots, DMRSs may not be included in every slot (e.g., every slot of the multiple slots used for joint channel estimation). The absence of DMRSs in a slot may result in DMRS overhead reduction and ultimately higher throughput. However, complete removal of DMRSs from a slot may have other consequences. For instance, if a slot has no DMRS symbols, it may be challenging for a UE 115 to identify resources for uplink control information multiplexing.

A UE 115 may use DMRS symbols as a reference to determine a location for phase tracking reference signal (PTRSs), and it may be appropriate to support alternate ways of determining PTRSs locations in a slot when DMRSs are absent in the slot. Similarly, when multiplexing uplink control information with data, where a payload of the uplink control information includes a HARQ ACK or NACK, the location of resources for multiplexing the uplink control information in a slot may depend on a location of DMRSs in the slot. Thus, it may be appropriate to support alternate ways of identifying resources for multiplexing uplink control information in a slot given a lack of DMRS symbols in the slot. As described herein, wireless communications system 100 may support efficient techniques for identifying resources in which to transmit uplink control information in a slot in an absence of DMRSs in the slot.

Figure 2:
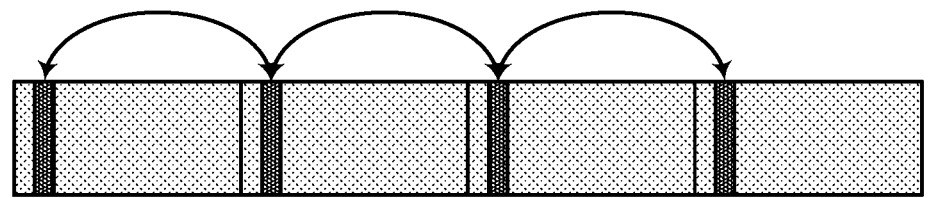
FIG. 2 illustrates examples of groups of slots allocated for uplink transmissions in accordance with aspects of the present disclosure.
Figure 2:
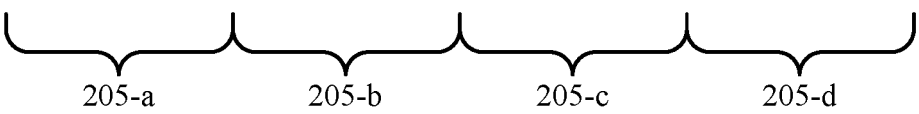
Figure 2:
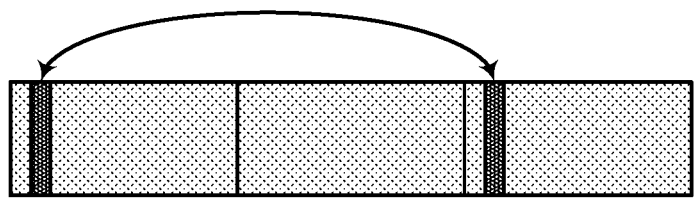
Figure 2:
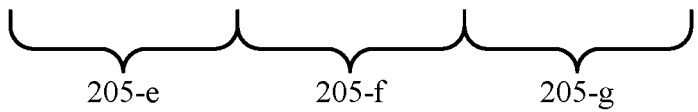

FIG. 2 illustrates examples of groups of slots 200 allocated for uplink transmissions in accordance with aspects of the present disclosure. In FIG. 2, a UE 115 may be scheduled for uplink transmissions 210 in slots 205. A base station 105 may also transmit DMRSs 215 in one or more of the slots 205 allocated for the uplink transmissions 210. The uplink transmissions 210 from the UE 115 may include uplink data transmissions or uplink data transmissions multiplexed with uplink control information.

In a first example 200-a, the UE 115 may be scheduled for uplink transmissions 210 in slots 205-a, 205-b, 205-c, and 205-d, and the UE 115 may use the DMRSs 215 received in these slots 205 to perform joint channel estimation. That is, the UE 115 may use the DMRSs 215 received in slots 205-a, 205-b, 205-c, and 205-d to perform joint channel estimation for these slots, and the UE 115 may identify parameters for uplink transmissions 210 in any of these slots based on the joint channel estimation. In a second example 200-b, the UE 115 may be scheduled for uplink transmissions 210 in slots 205-e, 205-f, and 205-g, and the UE 115 may use the DMRSs 215 received in these slots 205 to perform joint channel estimation. That is, the UE 115 may use the DMRSs 215 received in slots 205-e and 205-g to perform joint channel estimation for slots 205-e, 205-f, and 205-g, and the UE 115 may identify parameters for uplink transmissions 210 in any of slots 205-e, 205-f, and 205-g based on the joint channel estimation.

In some examples, the joint channel estimation may be referred to as cross-slot channel estimation. A UE 115 may support cross-slot channel estimation which may aim to enable channel estimation by leveraging DMRSs across all slots of a PUSCH or PDSCH transmission. Channel estimation losses may increase as a signal-to-noise ratio (SNR) decreases, and cell-edge UEs 115 may be most impacted. Cross-slot channel estimation may aim to aid cell-edge UEs 115 with a more robust channel estimation. Because the UE 115 may support cross-slot channel estimation, DMRS overhead may be reduced in certain slots. That is, since channel estimation may span multiple slots, not all slots may include DMRSs. Thus, the UE 115 may be scheduled for an uplink transmission in one or more slots with no DMRS symbols.

Figure 3:
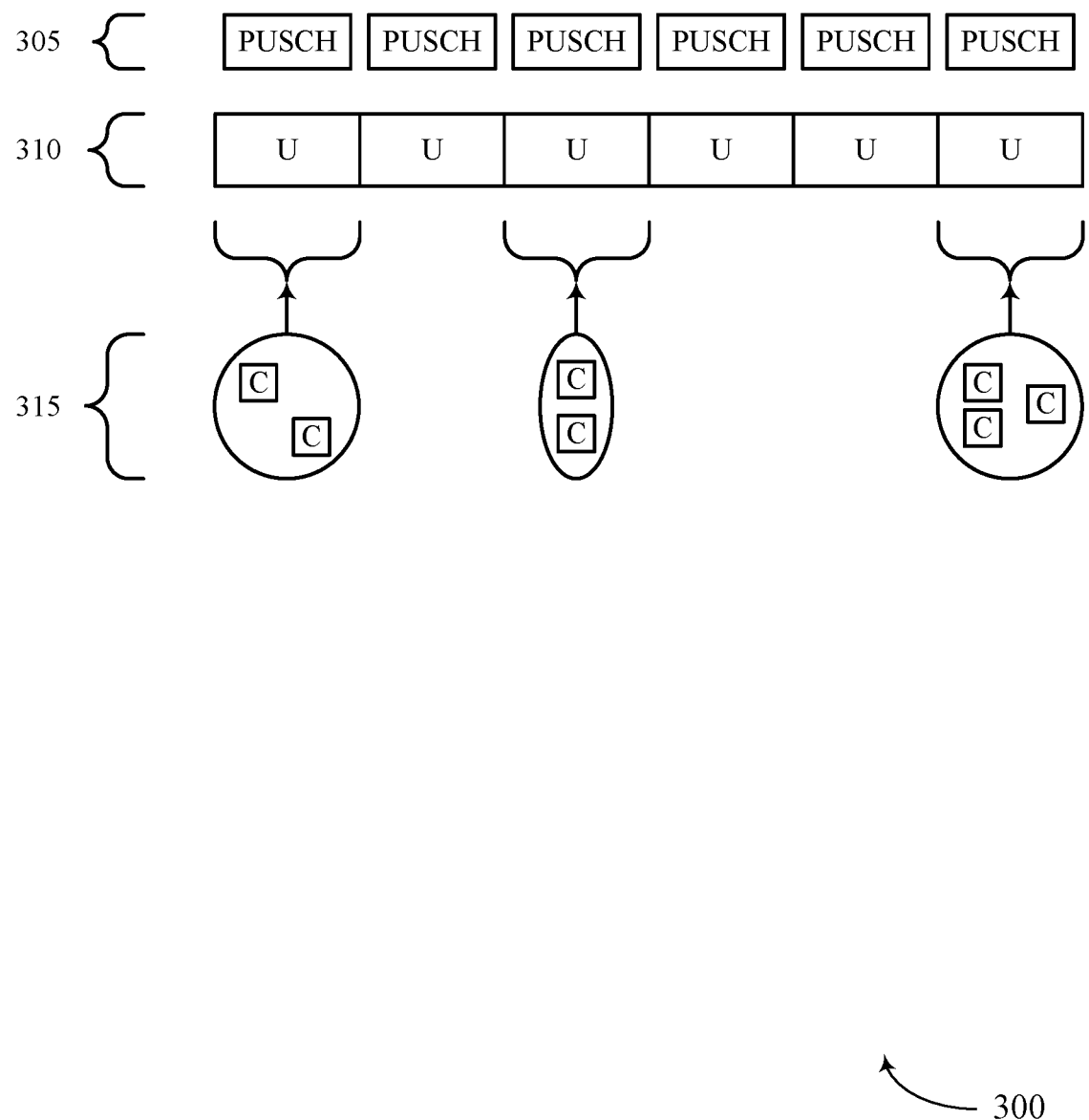
FIG. 3 illustrates an example of resources allocated for uplink transmissions in accordance with aspects of the present disclosure.

FIG. 3 illustrates an example of resources 300 allocated for uplink transmissions in accordance with aspects of the present disclosure. A base station 105 may allocate multiple uplink slots 310 to a UE 115 for uplink transmissions from the UE 115. The uplink transmissions from the UE 115 may include PUSCH transmissions 305 from the UE 115. In some cases, the UE 115 may determine to multiplex uplink control information 315 with one or more of the PUSCH transmission 305. For instance, multiple PUCCHs may overlap with a single PUSCH. In such cases, it may be appropriate for the UE 115 to identify resources in which to transmit the control information 315 in an uplink slot 310 with a PUSCH 305. The UE 115 may be configured with one or more rules for determining when and how to perform uplink control information multiplexing when a PUCCH overlaps with a PUSCH in a slot.

Figure 4:
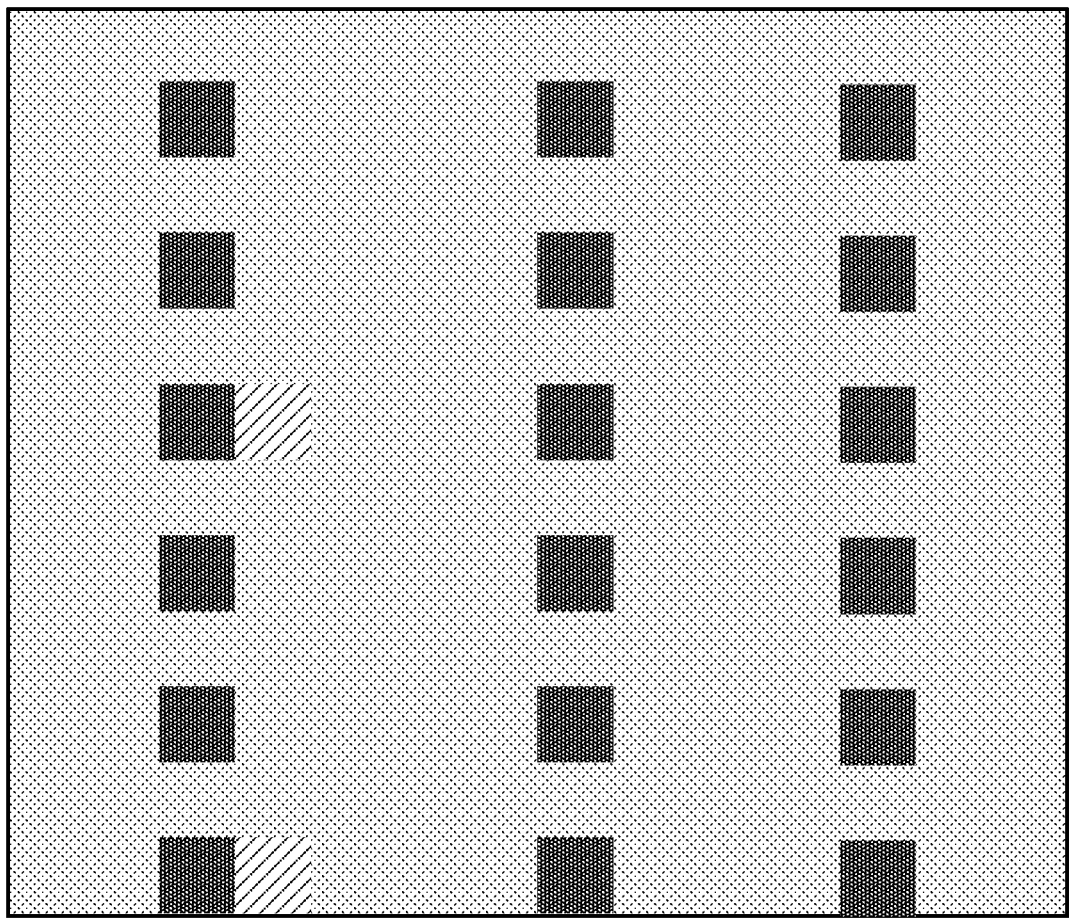
FIG. 4 illustrates an example of resources allocated for a physical uplink shared channel (PUSCH) transmission in accordance with aspects of the present disclosure.

FIG. 4 illustrates an example of resources 400 allocated for a PUSCH transmission (e.g., a PUSCH allocation) in accordance with aspects of the present disclosure. A UE 115 may use the allocated resources to transmit uplink data and control information 405 and feedback information 410, and the UE 115 may also receive DMRSs 415 from a base station 105 on the allocated resources. The feedback information 410 may also be referred to as uplink control information but may be different from other types of uplink control information (e.g., channel state information (CSI)). Different types of uplink control information may be multiplexed with a PUSCH when the corresponding PUSCH is intended to carry uplink control information that overlaps with the PUSCH.

In some examples, there may be three types of uplink control information payloads: HARQ ACK or NACK feedback, CSI part one, and CSI part two. A UE 115 may multiplex CSI part one from the beginning of a PUSCH allocation (e.g., first one or more symbols of the PUSCH allocation), and resources for the CSI part one may be assigned in a frequency-first, time-second manner. The CSI part one may be followed by CSI part two, and the UE 115 may map the CSI part two to an earliest set of resources not occupied by CSI part one. In some cases, both CSI payloads (e.g., CSI part one and CSI part two) may not be mapped to a DMRS symbol (e.g., a symbol including DMRSs 415). Further, resource elements set aside for CSI part two may be punctured by resource elements intended for a HARQ ACK or NACK payload (e.g., feedback information 410).

Figure 5:
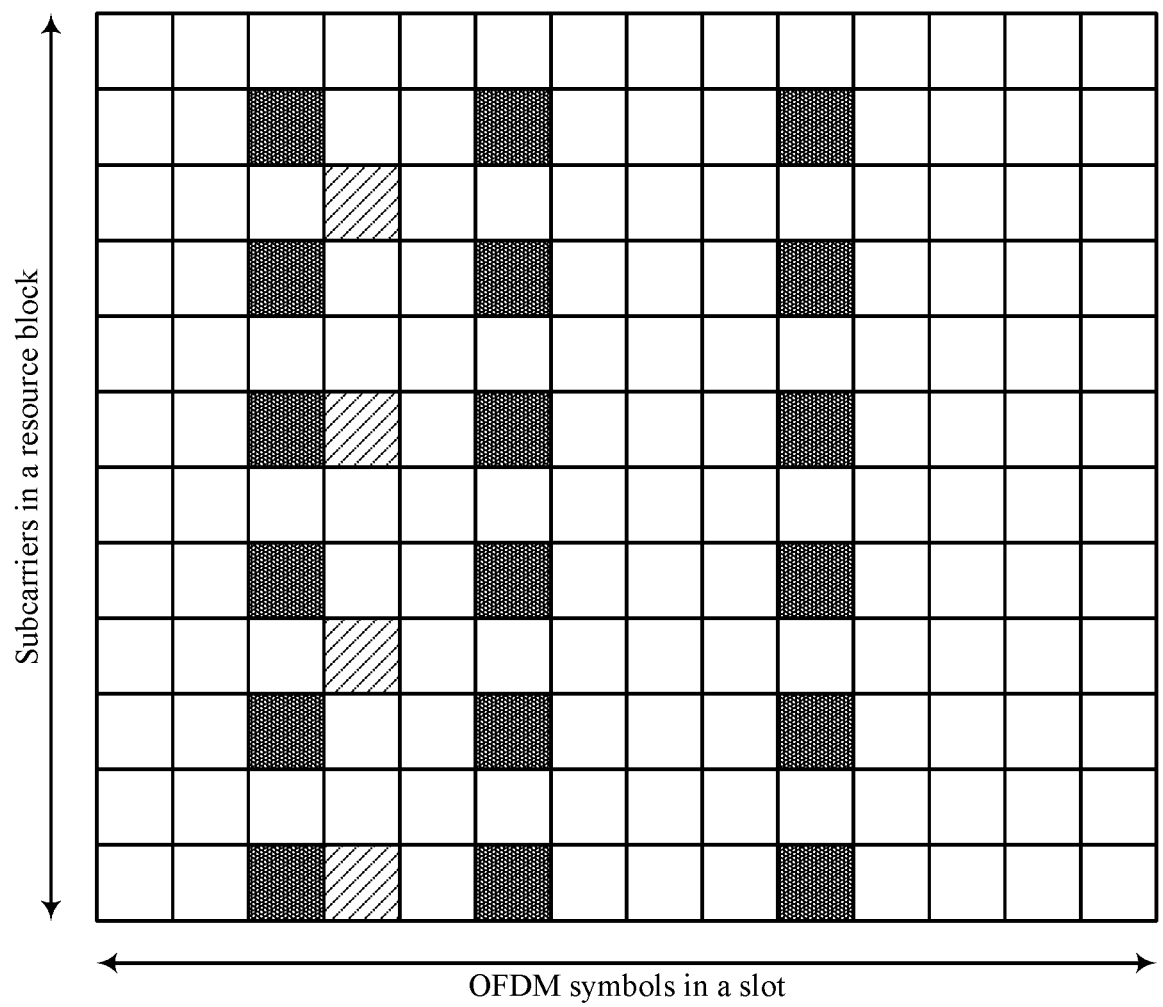
FIG. 5 illustrates an example of resources allocated for a PUSCH transmission in accordance with aspects of the present disclosure.

FIG. 5 illustrates an example of resources 500 allocated for a PUSCH transmission (e.g., a PUSCH allocation) in accordance with aspects of the present disclosure. In some cases, a UE 115 may multiplex uplink control information with uplink data on the resources allocated for the PUSCH transmission. In some examples, the uplink control information may include feedback information 505 also referred to as HARQ ACK or NACK payloads. These payloads may be highly critical for efficient functioning of a link between the UE 115 and a base station 105. Thus, it may be appropriate to carry these payloads with a high (e.g., best possible) reliability.

When uplink control information carrying HARQ ACK or NACK payloads is to be multiplexed with a PUSCH, a location of resource elements may determine an overall reliability of the uplink control information payload. For instance, a symbol immediately after (e.g., following) a DMRS symbol may be likely to have a most reliable channel estimate (e.g., due to proximity to DMRSs 510). Thus, a symbol immediately after DMRSs 510 may be used as a starting point for identifying resource elements for uplink control information multiplexing when uplink control information carries feedback information 505 (e.g., HARQ payloads).

Figure 6:
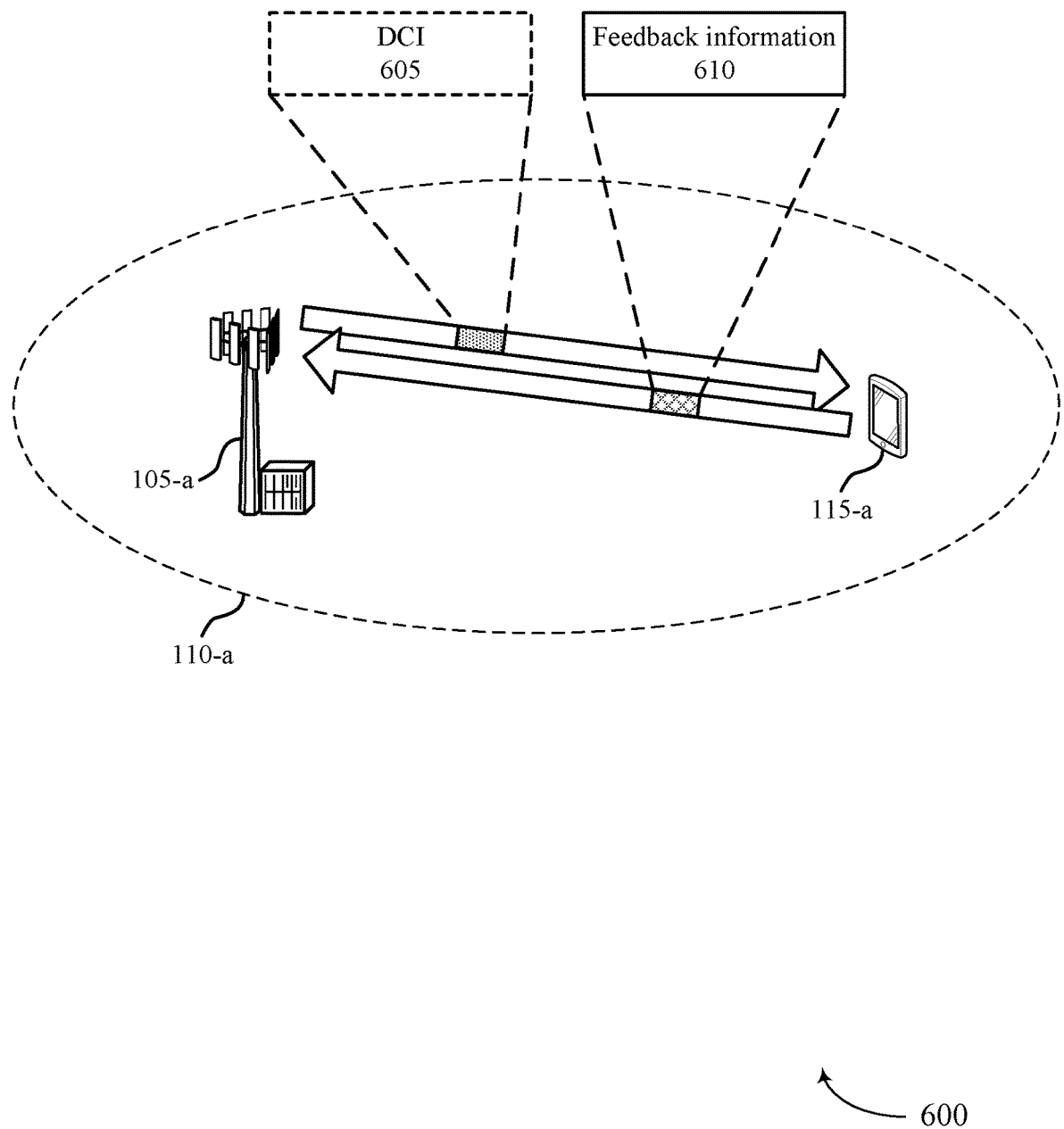
FIG. 6 illustrates an example of a wireless communications system that supports resources for uplink control information multiplexing in an absence of DMRSs in accordance with aspects of the present disclosure.

FIG. 6 illustrates an example of a wireless communications system 600 that supports resources for uplink control information multiplexing in an absence of DMRSs in accordance with aspects of the present disclosure. The wireless communications system 600 includes UE 115-*a*, which may be an example of a UE 115 described with reference to FIGS. 1-5. The wireless communications system 600 also includes base station 105-*a*, which may be an example of a base station 105 described with reference to FIGS. 1-5. The wireless communications system 600 may implement aspects of the wireless communications system 100. For example, the wireless communications system 600 may support efficient techniques for identifying resources in which to transmit uplink control information in a slot in an absence of DMRSs in the slot.

The base station 105-*a* may transmit, and the UE 115-*a* may receive, downlink control information (DCI) scheduling multiple uplink transmissions from the UE 115-*a* in multiple slots. The multiple uplink transmissions may be repetition-based uplink transmissions to improve reliability or improve a chance that data included in the uplink transmissions is received by the base station 105-*a*. An uplink transmission in the repetition-based uplink transmissions may be referred to as a PUSCH repetition. In some examples, the UE 115-*a* may determine to multiplex uplink control information with an uplink transmission of the scheduled uplink transmissions in a slot of the multiple slots. The uplink control information may include feedback information 610, and it may be appropriate for the UE 115-*a* to identify a symbol in the slot in which to transmit the feedback information 610. However, the slot may lack DMRSs. That is, the UE 115-*a* may be configured to use DMRS bundling or perform joint channel estimation on the multiple slots, and DMRSs may be absent in the slot. Thus, the UE 115-*a* may use the techniques described herein to identify the symbol in the slot in which to transmit the feedback information 610 based on an absence of DMRSs in the slot.

In the case that DMRS bundling is activated and a DMRS is eliminated in a PUSCH repetition or a slot, the location of eliminated DMRS resource elements in the slot may be used as a reference for identifying a symbol in which to transmit the feedback information 610 in the slot. The location of eliminated DMRS resource elements may refer to a symbol previously configured (e.g., via RRC signaling) to include DMRSs. Additionally, or alternatively, a location of DMRSs in a previous PUSCH repetition or slot or a beginning of the slot (e.g., first symbol in the slot) may be used as a reference (e.g., basis) for identifying a symbol in which to transmit the feedback information 610 in the slot. Thus, the UE 115-*a* may determine a location of resource elements for uplink control information multiplexing when the uplink control information carries a HARQ ACK or NACK payload based on a reference symbol. A relation between the symbol in which to transmit the feedback information 610 and the reference symbol may be defined at the UE 115-*a* (e.g., there may be a possibility of a preconfigured or predefined shift in time from the reference symbol).

In some aspects, the symbols containing resource elements for uplink control information multiplexing in a PUSCH repetition without DMRSs may start at a beginning of a set of symbols indicated in a time-domain resource allocation (TDRA). For instance, the UE 115-*a* may map uplink control information to a first symbol in the set of symbols indicated in the TDRA. In some cases, there may be multiple predefined or preconfigured options for symbol and resource element selection for uplink control information multiplexing for a PUSCH, and one of the options may be selected by a scheduling DCI (e.g., DCI 605). For instance, the UE 115-*a* may receive signaling from the base station 105-*a* indicating an option for identifying a symbol in a slot in which to include the feedback information 610 in an absence of DMRSs in the slot. The set of preconfigured options may be a subset of a larger set of predefined options.

After identifying a symbol in which to transmit the feedback information 610, the UE 115-*a* may select resource elements in the symbol in which to transmit the feedback information 610 based on one or more rules. For instance, the UE 115-*a* may select the resource elements in the symbol of a resource block in which to transmit the feedback information 610 based on a quantity of tones in the resource block allocated for the feedback information 610. In one example, if a resource block includes 12 tones, and the UE 115-*a* is configured to transmit the feedback information 610 in two tones, the UE 115-*a* may transmit the feedback information 610 in a first and seventh tone (e.g., the UE 115-*a* may spread out the feedback information 610). Alternatively, if the UE 115-*a* is configured to transmit the feedback information 610 in more than two tones, the UE 115-*a* may transmit the feedback information 610 in contiguous resource elements. In some cases, the UE 115-*a* may also identify the symbol in which to transmit the feedback information 610 based on a size of a payload of the feedback information 610 (e.g., a size of the HARQ-ACK payload carried by the uplink control information getting multiplexed).

Using the techniques described herein, the UE 115-*a* may be able to identify a suitable symbol in a slot in which to transmit the feedback information 610 to the base station 105-*a*.

If the slot allocated for a PUSCH includes DMRSs, and frequency hopping is not configured for the PUSCH, denote $l^{(1)}$ as an OFDM symbol index of the first OFDM symbol after a first set of consecutive OFDM symbols carrying DMRSs. Further, if the slot allocated for a PUSCH includes DMRSs, and frequency hopping is configured for the PUSCH, denote $l^{(1)}$ as an OFDM symbol index of the first OFDM symbol after a first set of consecutive OFDM symbols carrying DMRSs in a first hop, and denote $l^{(2)}$ as an OFDM symbol index of the first OFDM symbol after a first set of consecutive OFDM symbols carrying DMRSs in a second hop. The UE 115-*a* may then transmit the feedback information 610 in a symbol with the OFDM symbol index denoted as $l^{(1)}$ or $l^{(2)}$.

Alternatively, if DMRSs is absent in a slot allocated for a PUSCH, and frequency hopping is not configured for the PUSCH, denote $l^{(1)}$ or $l^{(n)}$ as an OFDM symbol index of the first OFDM symbol or an nth OFDM symbol after a reference symbol, respectively. Further, if DMRSs is absent in a slot allocated for a PUSCH, and frequency hopping is configured for the PUSCH, denote $1^{(1)}$ or $1^{(n)}$ as an OFDM symbol index of the first OFDM symbol or an nth OFDM symbol after a reference symbol in a first hop, respectively, and denote $1^{(1)}$ or $1^{(n)}$ as an OFDM symbol index of the first OFDM symbol or an nth OFDM symbol after a reference symbol in a second hop. The UE 115-*a* may then transmit the feedback information 610 in a symbol with the OFDM symbol index denoted as or $1^{(n)}$, $1^{(1)}$, or $1^{(2)}$.

Figure 7:
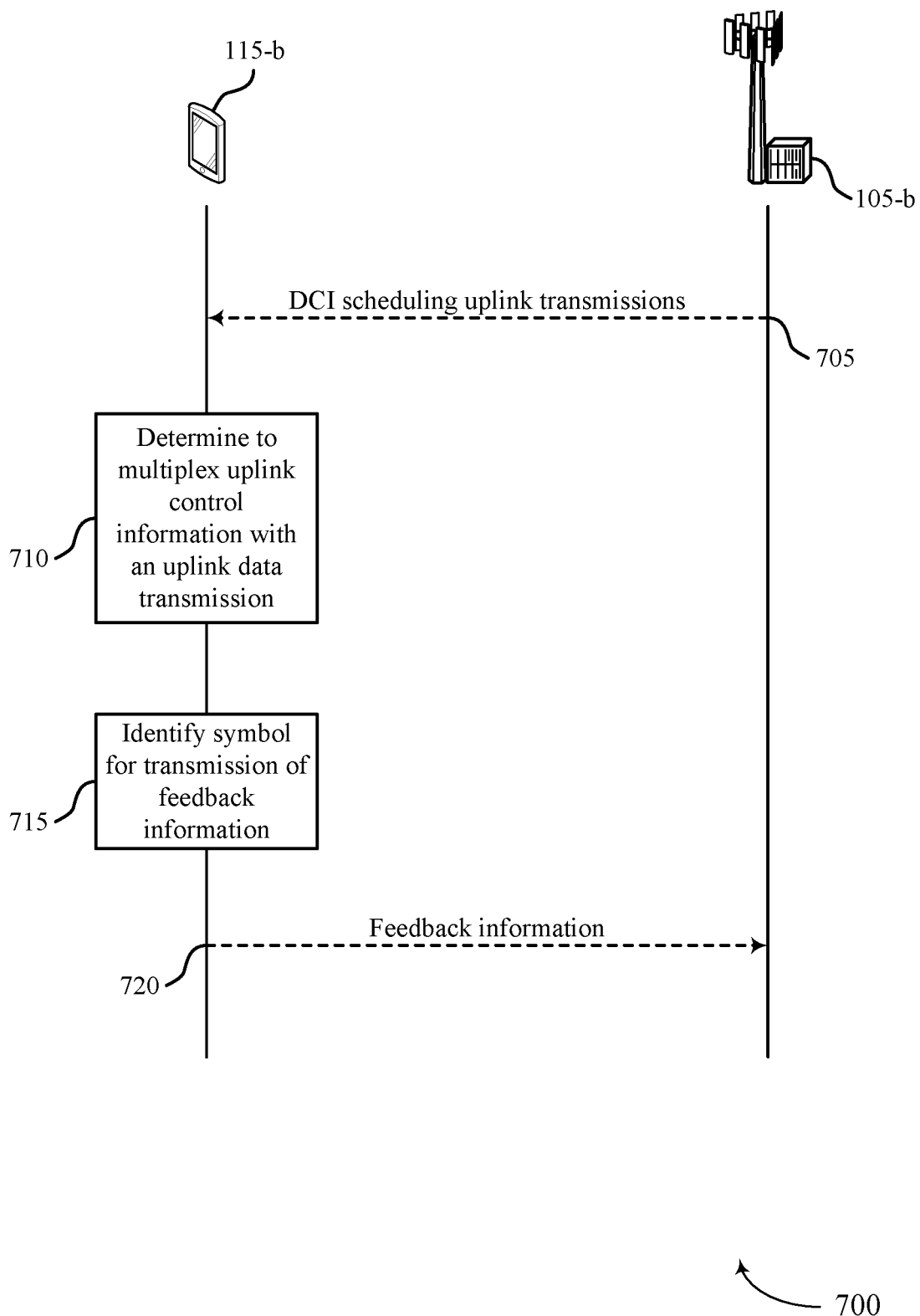
FIG. 7 illustrates an example of a process flow that supports resources for uplink control information multiplexing in an absence of DMRSs in accordance with aspects of the present disclosure.

FIG. 7 illustrates an example of a process flow 700 that supports resources for uplink control information multiplexing in an absence of DMRSs in accordance with aspects of the present disclosure. Process flow 700 includes UE 115-*b*, which may be an example of a UE 115 described with reference to FIGS. 1-6. Process flow 700 also includes base station 105-*b*, which may be an example of a base station 105 described with reference to FIGS. 1-6. The process flow 700 may implement aspects of wireless communications system 600. For example, the process flow 700 may support efficient techniques for identifying resources in which to transmit uplink control information in a slot in an absence of DMRSs in the slot.

In the following description of the process flow 700, the signaling exchanged between the UE 115-*b* and the base station 105-*b* may be exchanged in a different order than the example order shown, or the operations performed by the UE 115-*b* and the base station 105-*b* may be performed in different orders or at different times. Some operations may also be omitted from the process flow 700, and other operations may be added to the process flow 700.

At 705, the base station 105-*b* may transmit, and the UE 115-*b* may receive, DCI scheduling uplink data transmissions from the UE 115-*b* to the base station 105-*b* in multiple slots. At 710, the UE 115-*b* may determine that uplink control information including feedback information is to be multiplexed with an uplink data transmission of the scheduled uplink data transmissions in a slot of the multiple slots.

At 715, the UE 115-*b* may identify a symbol for transmission of the feedback information in the slot based on an absence of a DMRS in the slot. The absence of the DMRS in the slot may be due to the UE 115-*b* using DMRS bundling across the multiple slots. In some cases, the UE 115-*b* may identify the symbol for transmission of the feedback information in the slot based on a reference symbol. The reference symbol may be previously configured to include DMRSs in the slot, or the reference symbol may be in a location of the slot that corresponds to a timing of a previous DMRS in a previous slot, or the reference symbol may be a first symbol in the slot. In some cases, a relation between the identified symbol for transmission of the feedback information in the slot and the reference symbol may be defined at the UE 115-*b*.

In some cases, the base station 105-*b* may transmit, and the UE 115-*b* may receive, a TDRA indicating a set of symbols in the slot allocated for the uplink data transmission. In such cases, the UE 115-*b* may identify the symbol for transmission of the feedback information in the slot based on the set of symbols in the slot allocated for the uplink data transmission. For instance, the UE 115-*b* may identify the symbol for transmission of the feedback information in the slot based on a reference symbol, and the reference symbol may be a first symbol in the set of symbols in the slot allocated for the uplink data transmission. In some cases, the symbol identified for transmission of the feedback information in the slot is a first symbol in the set of symbols allocated for the uplink data transmission.

In some cases, the UE 115-*b* and the base station 105-*b* may identify multiple options for identifying the symbol for transmission of the feedback information in the slot. In such cases, the base station 105-*b* may transmit, and the UE 115-*b* may receive, in the DCI at 705, an indication of an option of the multiple options to use for identifying the symbol for transmission of the feedback information in the slot. The multiple options may include options for which reference symbol the UE 115-*b* is to use to identify the symbol for transmission of the feedback information in the slot. In some cases, the UE 115-*b* may identify one or more resource elements in the identified symbol on which to transmit the feedback information based on a quantity of tones in a resource block allocated for transmitting the feedback information. In some cases, the UE 115-*b* may identify the symbol for transmission of the feedback information in the slot based on a size of a payload of the feedback information.

At 720, the UE 115-*b* may transmit, and the base station 105-*b* may receive, the feedback information in the identified symbol. For instance, the UE 115-*b* may transmit, and the base station 105-*b* may receive, uplink control information including the feedback information multiplexed with the uplink data transmission of the scheduled uplink data transmissions in the slot of the multiple slots. Similar to the UE 115-*b*, the base station 105-*b* may identify the symbol including the feedback information in the slot based on an absence of a DMRS in the slot. For instance, the base station 105-*b* may identify the symbol including the feedback information in the slot based on a reference symbol. In some cases, a relation between the identified symbol including the feedback information in the slot and the reference symbol may be defined at the base station 105-*b*.

In some cases, if the base station 105-*b* transmits a TDRA indicating a set of symbols in the slot allocated for the uplink data transmission, the base station 105-*b* may also identify the symbol including the feedback information in the slot based on the set of symbols in the slot allocated for the uplink data transmission. The symbol including the feedback information in the slot may be a first symbol in the set of symbols allocated for the uplink data transmission. In some cases, the base station 105-*b* may identify one or more resource elements in the identified symbol including the feedback information based on a quantity of tones in a resource block allocated for the feedback information. In some cases, the base station 105-*b* may identify the symbol including the feedback information in the slot based on a size of a payload of the feedback information.

Once the base station 105-*b* identifies the symbol that includes the feedback information from the UE 115-*b*, the base station 105-*b* may decode the feedback information in the identified symbol.

Figure 8:
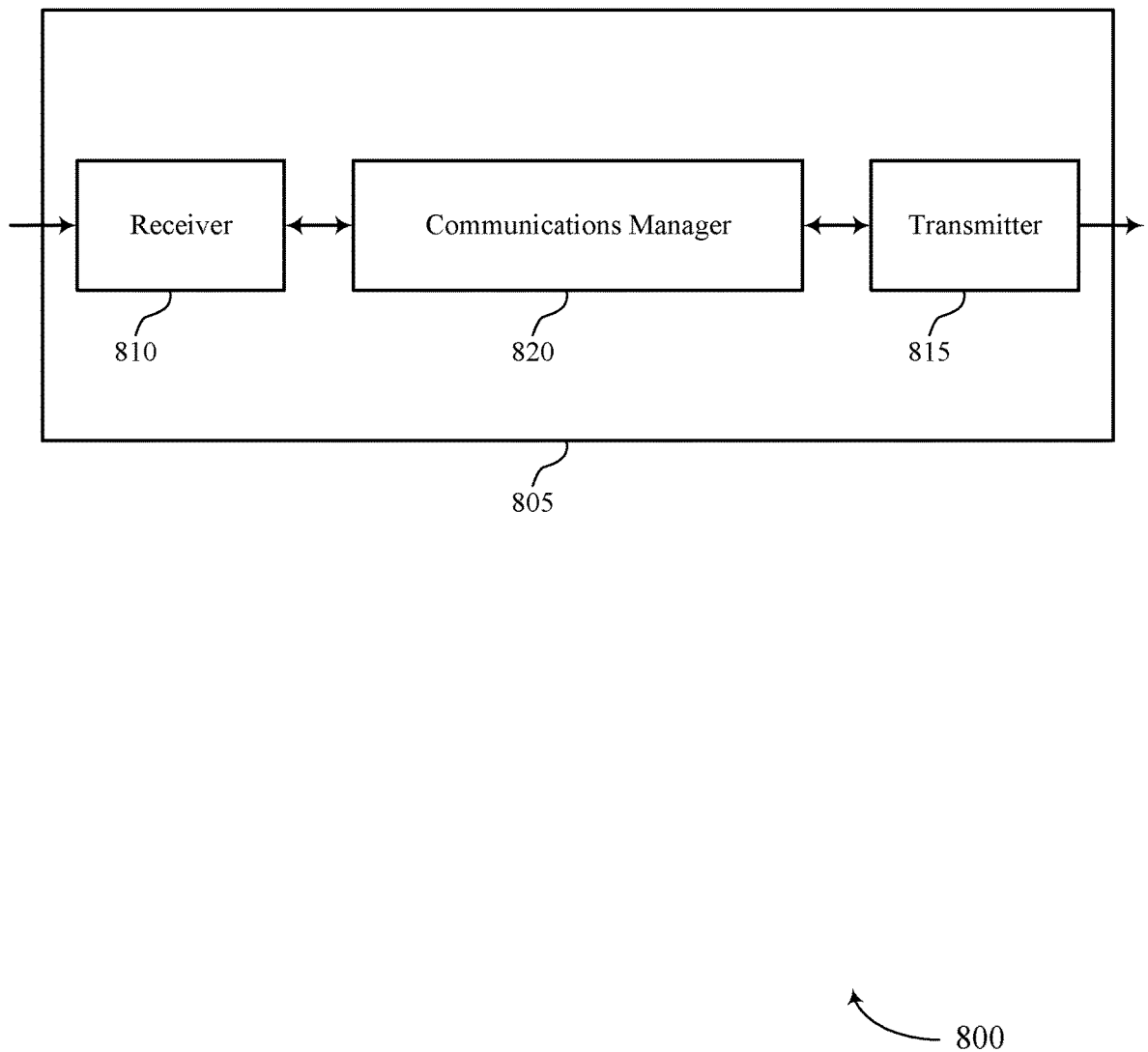
FIGS. 8 and 9 show block diagrams of devices that support resources for uplink control information multiplexing in an absence of DMRSs in accordance with aspects of the present disclosure.

FIG. 8 shows a block diagram 800 of a device 805 that supports resources for uplink control information multiplexing in an absence of DMRSs in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to resources for uplink control information multiplexing in an absence of demodulation reference signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resources for uplink control information multiplexing in an absence of demodulation reference signals). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of resources for uplink control information multiplexing in an absence of DMRSs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, downlink control information scheduling uplink data transmissions from the UE to the base station in a set of multiple slots. The communications manager 820 may be configured as or otherwise support a means for determining that uplink control information including feedback information is to be multiplexed with an uplink data transmission of the scheduled uplink data transmissions in a slot of the set of multiple slots. The communications manager 820 may be configured as or otherwise support a means for identifying a symbol for transmission of the feedback information in the slot based on an absence of a demodulation reference signal in the slot. The communications manager 820 may be configured as or otherwise support a means for transmitting the feedback information in the identified symbol.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources. In particular, the techniques described herein may facilitate DMRS bundling or joint channel estimation across multiple slots where DMRSs may be absent in one or more slots of the multiple slots. Accordingly, a UE or a base station may use resources previously configured for DMRSs in the one or more slots to transmit data or control information, resulting in improved throughput and more efficient utilization of communication resources.

Figure 9:
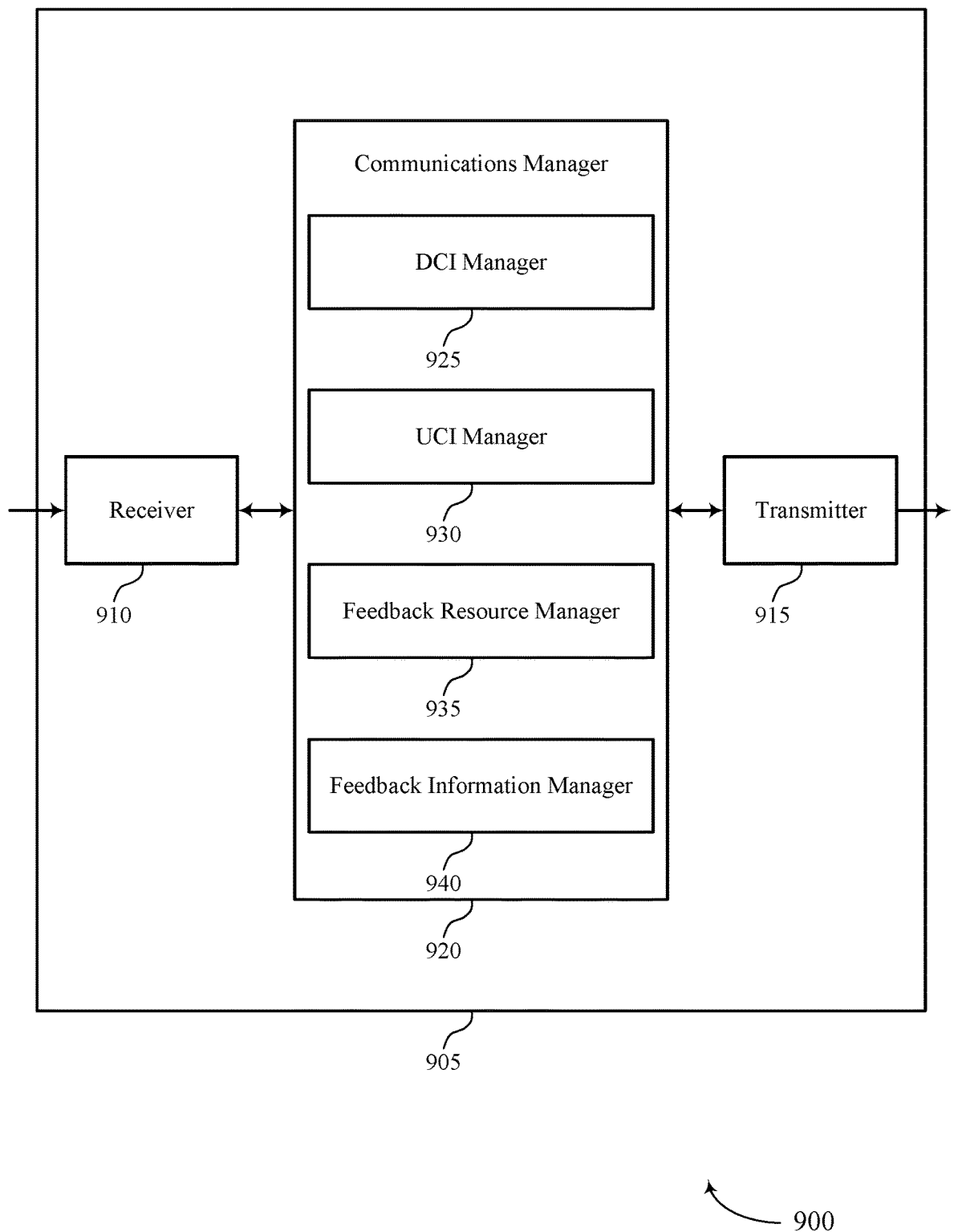

FIG. 9 shows a block diagram 900 of a device 905 that supports resources for uplink control information multiplexing in an absence of DMRSs in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to resources for uplink control information multiplexing in an absence of demodulation reference signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to resources for uplink control information multiplexing in an absence of demodulation reference signals). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of resources for uplink control information multiplexing in an absence of DMRSs as described herein. For example, the communications manager 920 may include a DCI manager 925, an uplink control information (UCI) manager 930, a feedback resource manager 935, a feedback information manager 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The DCI manager 925 may be configured as or otherwise support a means for receiving, from a base station, downlink control information scheduling uplink data transmissions from the UE to the base station in a set of multiple slots. The UCI manager 930 may be configured as or otherwise support a means for determining that uplink control information including feedback information is to be multiplexed with an uplink data transmission of the scheduled uplink data transmissions in a slot of the set of multiple slots. The feedback resource manager 935 may be configured as or otherwise support a means for identifying a symbol for transmission of the feedback information in the slot based on an absence of a demodulation reference signal in the slot. The feedback information manager 940 may be configured as or otherwise support a means for transmitting the feedback information in the identified symbol.

Figure 10:
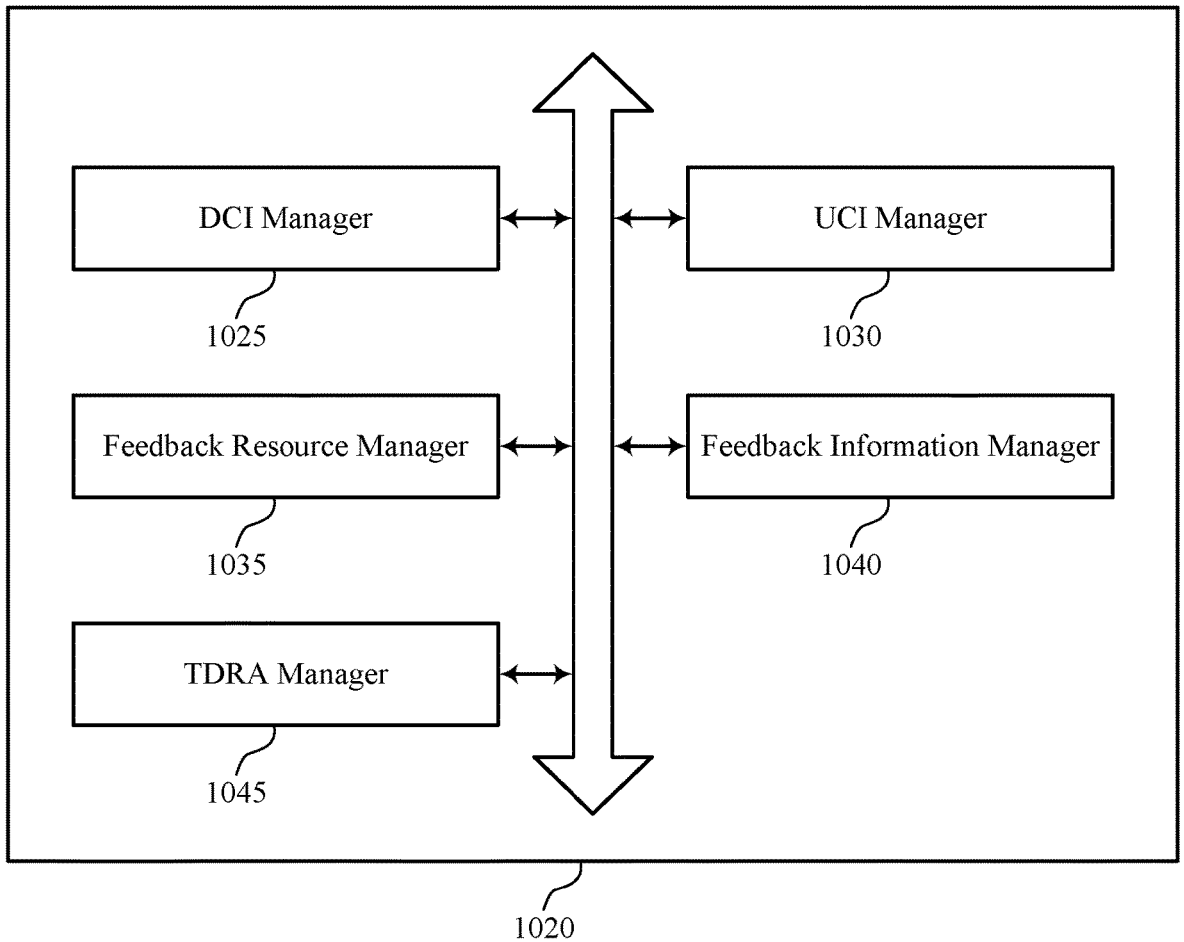
FIG. 10 shows a block diagram of a communications manager that supports resources for uplink control information multiplexing in an absence of DMRSs in accordance with aspects of the present disclosure.

FIG. 10 shows a block diagram 1000 of a communications manager 1020 that supports resources for uplink control information multiplexing in an absence of DMRSs in accordance with aspects of the present disclosure. The communications manager 1020 may be an example of aspects of a communications manager 820, a communications manager 920, or both, as described herein. The communications manager 1020, or various components thereof, may be an example of means for performing various aspects of resources for uplink control information multiplexing in an absence of DMRSs as described herein. For example, the communications manager 1020 may include a DCI manager 1025, a UCI manager 1030, a feedback resource manager 1035, a feedback information manager 1040, a TDRA manager 1045, or any combination thereof. Each of these components may communicate, directly or indirectly, with one another (e.g., via one or more buses).

The communications manager 1020 may support wireless communication at a UE in accordance with examples as disclosed herein. The DCI manager 1025 may be configured as or otherwise support a means for receiving, from a base station, downlink control information scheduling uplink data transmissions from the UE to the base station in a set of multiple slots. The UCI manager 1030 may be configured as or otherwise support a means for determining that uplink control information including feedback information is to be multiplexed with an uplink data transmission of the scheduled uplink data transmissions in a slot of the set of multiple slots. The feedback resource manager 1035 may be configured as or otherwise support a means for identifying a symbol for transmission of the feedback information in the slot based on an absence of a demodulation reference signal in the slot. The feedback information manager 1040 may be configured as or otherwise support a means for transmitting the feedback information in the identified symbol.

In some examples, to support identifying the symbol for transmission of the feedback information in the slot, the feedback resource manager 1035 may be configured as or otherwise support a means for identifying the symbol for transmission of the feedback information in the slot based on a reference symbol.

In some examples, the reference symbol was previously configured to include demodulation reference signals in the slot, or is in a location of the slot that corresponds to a timing of a previous demodulation reference signal in a previous slot, or is a first symbol in the slot, or is a first symbol of a set of symbols in the slot allocated for the uplink data transmission.

In some examples, a relation between the identified symbol for transmission of the feedback information in the slot and the reference symbol is defined at the UE.

In some examples, the TDRA manager 1045 may be configured as or otherwise support a means for receiving a time-domain resource allocation indicating a set of symbols in the slot allocated for the uplink data transmission, where identifying the symbol for transmission of the feedback information in the slot is based on the set of symbols in the slot allocated for the uplink data transmission.

In some examples, the symbol identified for transmission of the feedback information in the slot is a first symbol in the set of symbols allocated for the uplink data transmission.

In some examples, the feedback resource manager 1035 may be configured as or otherwise support a means for identifying a set of multiple options for identifying the symbol for transmission of the feedback information in the slot. In some examples, the feedback resource manager 1035 may be configured as or otherwise support a means for receiving, from the base station in the downlink control information, an indication of an option of the set of multiple options to use for identifying the symbol for transmission of the feedback information in the slot.

In some examples, the set of multiple options includes options for which reference symbol the UE is to use to identify the symbol for transmission of the feedback information in the slot.

In some examples, the feedback resource manager 1035 may be configured as or otherwise support a means for identifying one or more resource elements in the identified symbol on which to transmit the feedback information based on a quantity of tones in a resource block allocated for transmitting the feedback information.

In some examples, to support identifying the symbol for transmission of the feedback information in the slot, the feedback resource manager 1035 may be configured as or otherwise support a means for identifying the symbol for transmission of the feedback information in the slot based on a size of a payload of the feedback information.

In some examples, the absence of the demodulation reference signal in the slot is due to the UE using demodulation reference signal bundling across the set of multiple slots.

Figure 11:
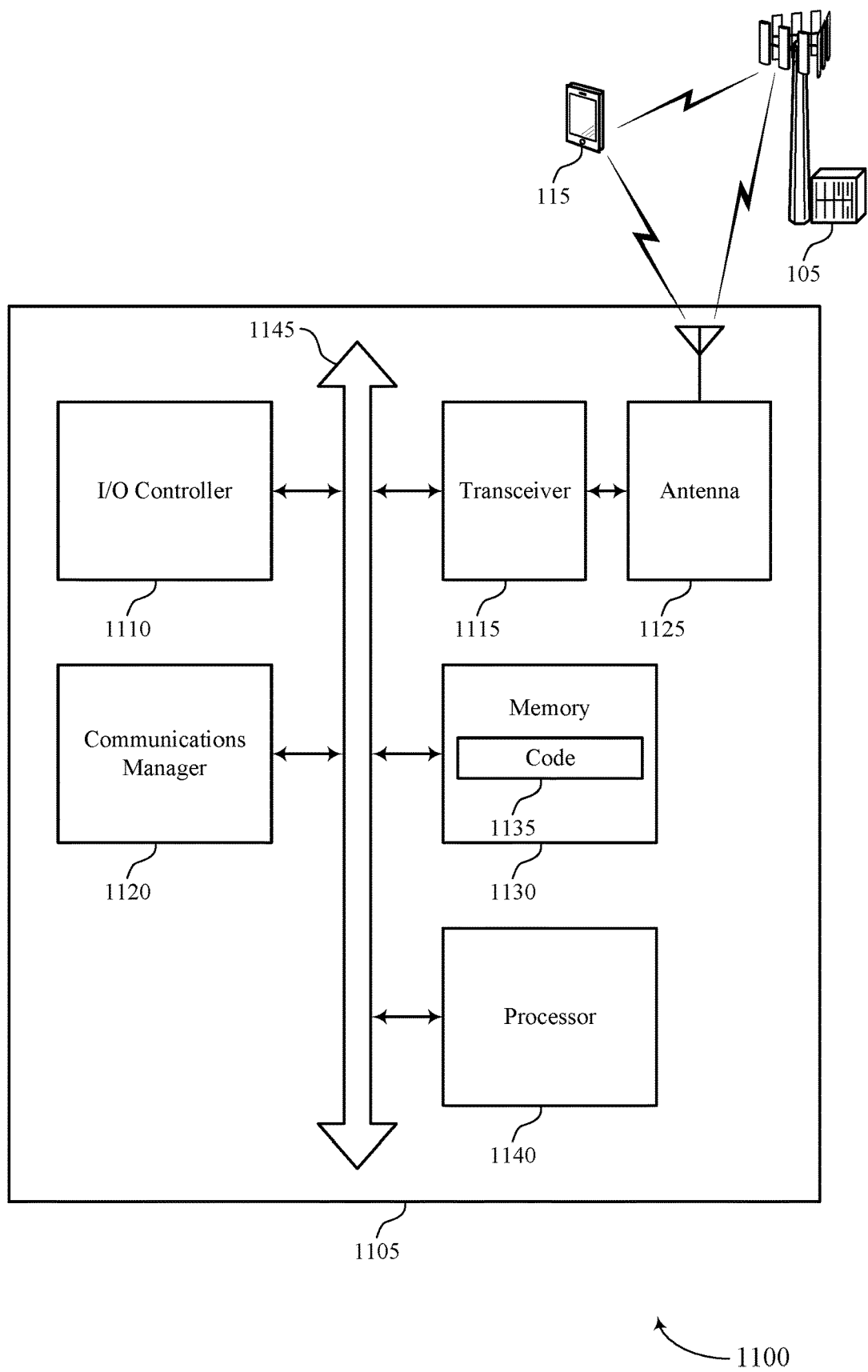
FIG. 11 shows a diagram of a system including a device that supports resources for uplink control information multiplexing in an absence of DMRSs in accordance with aspects of the present disclosure.

FIG. 11 shows a diagram of a system 1100 including a device 1105 that supports resources for uplink control information multiplexing in an absence of DMRSs in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting resources for uplink control information multiplexing in an absence of demodulation reference signals). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, downlink control information scheduling uplink data transmissions from the UE to the base station in a set of multiple slots. The communications manager 1120 may be configured as or otherwise support a means for determining that uplink control information including feedback information is to be multiplexed with an uplink data transmission of the scheduled uplink data transmissions in a slot of the set of multiple slots. The communications manager 1120 may be configured as or otherwise support a means for identifying a symbol for transmission of the feedback information in the slot based on an absence of a demodulation reference signal in the slot. The communications manager 1120 may be configured as or otherwise support a means for transmitting the feedback information in the identified symbol.

By including or configuring the communications manager 1120 in accordance with examples as described herein, the device 1105 may support techniques for more efficient utilization of communication resources. In particular, the techniques described herein may facilitate DMRS bundling or joint channel estimation across multiple slots where DMRSs may be absent in one or more slots of the multiple slots. Accordingly, a UE or a base station may use resources previously configured for DMRSs in the one or more slots to transmit data or control information, resulting in improved throughput and more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of resources for uplink control information multiplexing in an absence of DMRSs as described herein, or the processor 1140 and the memory 1130 may be otherwise configured to perform or support such operations.

Figure 12:
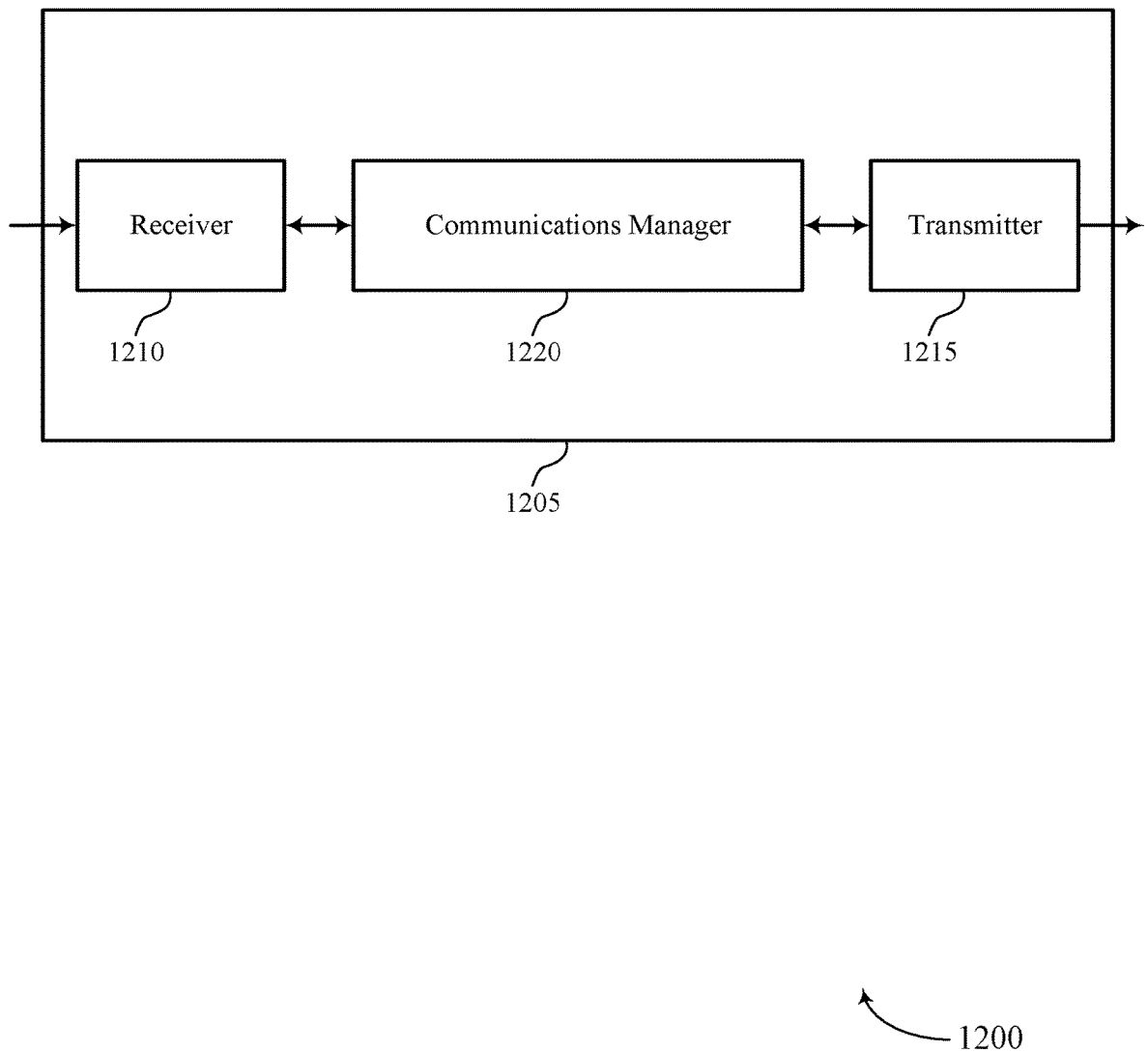
FIGS. 12 and 13 show block diagrams of devices that support resources for uplink control information multiplexing in an absence of DMRSs in accordance with aspects of the present disclosure.

FIG. 12 shows a block diagram 1200 of a device 1205 that supports resources for uplink control information multiplexing in an absence of DMRSs in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to resources for uplink control information multiplexing in an absence of demodulation reference signals). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to resources for uplink control information multiplexing in an absence of demodulation reference signals). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of resources for uplink control information multiplexing in an absence of DMRSs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, downlink control information scheduling uplink data transmissions from the UE to the base station in a set of multiple slots. The communications manager 1220 may be configured as or otherwise support a means for receiving, from the UE, uplink control information including feedback information from the UE multiplexed with an uplink data transmission of the scheduled uplink data transmissions in a slot of the set of multiple slots. The communications manager 1220 may be configured as or otherwise support a means for identifying a symbol including the feedback information in the slot based on an absence of a demodulation reference signal in the slot. The communications manager 1220 may be configured as or otherwise support a means for decoding the feedback information in the identified symbol.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for more efficient utilization of communication resources. In particular, the techniques described herein may facilitate DMRS bundling or joint channel estimation across multiple slots where DMRSs may be absent in one or more slots of the multiple slots. Accordingly, a UE or a base station may use resources previously configured for DMRSs in the one or more slots to transmit data or control information, resulting in improved throughput and more efficient utilization of communication resources.

Figure 13:
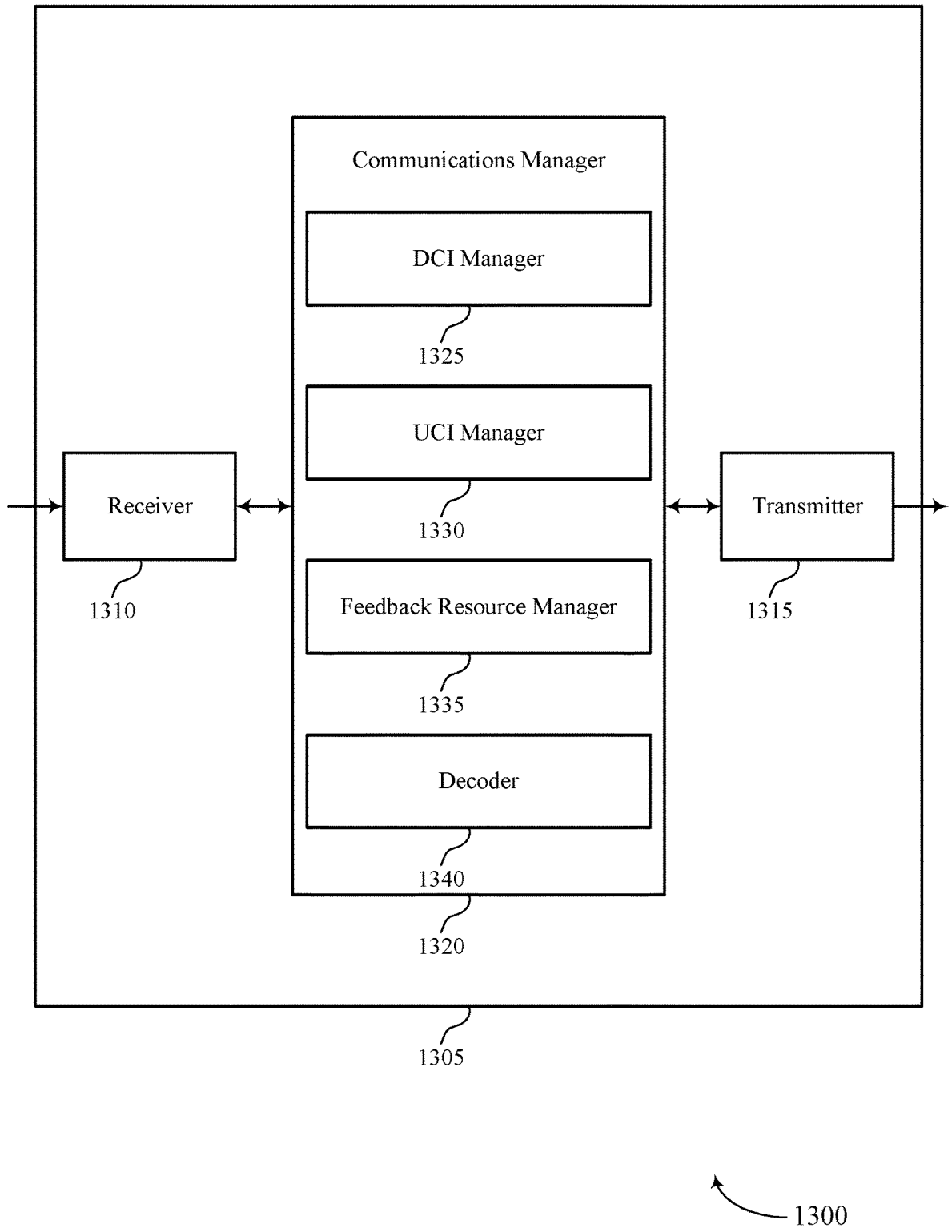

FIG. 13 shows a block diagram 1300 of a device 1305 that supports resources for uplink control information multiplexing in an absence of DMRSs in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to resources for uplink control information multiplexing in an absence of demodulation reference signals). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to resources for uplink control information multiplexing in an absence of demodulation reference signals). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of resources for uplink control information multiplexing in an absence of DMRSs as described herein. For example, the communications manager 1320 may include a DCI manager 1325, a UCI manager 1330, a feedback resource manager 1335, a decoder 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The DCI manager 1325 may be configured as or otherwise support a means for transmitting, to a UE, downlink control information scheduling uplink data transmissions from the UE to the base station in a set of multiple slots. The UCI manager 1330 may be configured as or otherwise support a means for receiving, from the UE, uplink control information including feedback information from the UE multiplexed with an uplink data transmission of the scheduled uplink data transmissions in a slot of the set of multiple slots. The feedback resource manager 1335 may be configured as or otherwise support a means for identifying a symbol including the feedback information in the slot based on an absence of a demodulation reference signal in the slot. The decoder 1340 may be configured as or otherwise support a means for decoding the feedback information in the identified symbol.

Figure 14:
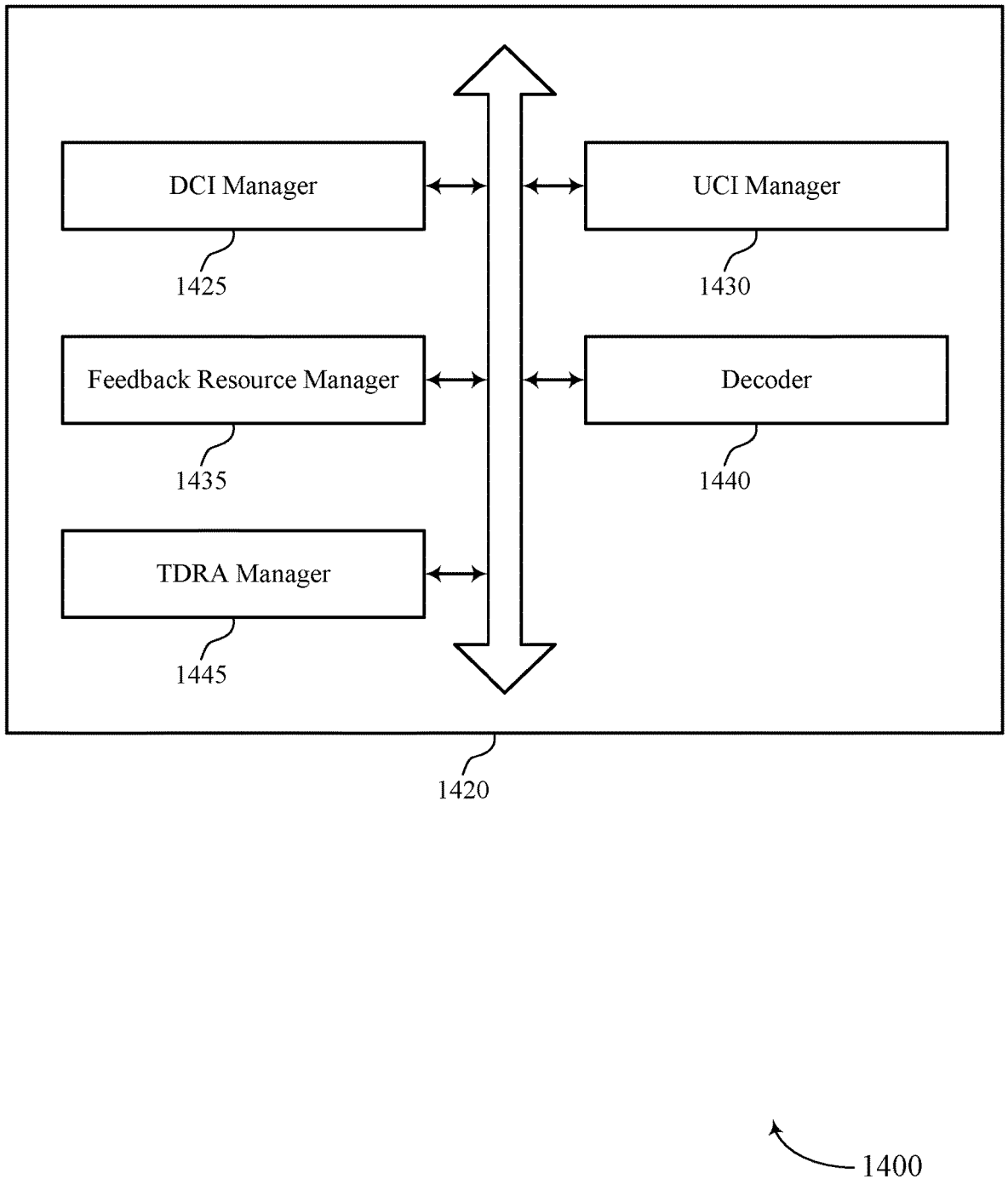
FIG. 14 shows a block diagram of a communications manager that supports resources for uplink control information multiplexing in an absence of DMRSs in accordance with aspects of the present disclosure.

FIG. 14 shows a block diagram 1400 of a communications manager 1420 that supports resources for uplink control information multiplexing in an absence of DMRSs in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of resources for uplink control information multiplexing in an absence of DMRSs as described herein. For example, the communications manager 1420 may include a DCI manager 1425, a UCI manager 1430, a feedback resource manager 1435, a decoder 1440, a TDRA manager 1445, or any combination thereof. Each of these components may communicate, directly or indirectly, with one another (e.g., via one or more buses).

The communications manager 1420 may support wireless communication at a base station in accordance with examples as disclosed herein. The DCI manager 1425 may be configured as or otherwise support a means for transmitting, to a UE, downlink control information scheduling uplink data transmissions from the UE to the base station in a set of multiple slots. The UCI manager 1430 may be configured as or otherwise support a means for receiving, from the UE, uplink control information including feedback information from the UE multiplexed with an uplink data transmission of the scheduled uplink data transmissions in a slot of the set of multiple slots. The feedback resource manager 1435 may be configured as or otherwise support a means for identifying a symbol including the feedback information in the slot based on an absence of a demodulation reference signal in the slot. The decoder 1440 may be configured as or otherwise support a means for decoding the feedback information in the identified symbol.

In some examples, to support identifying the symbol including the feedback information in the slot, the feedback resource manager 1435 may be configured as or otherwise support a means for identifying the symbol including the feedback information in the slot based on a reference symbol.

In some examples, the reference symbol was previously configured to include demodulation reference signals in the slot, or is in a location of the slot that corresponds to a timing of a previous demodulation reference signal in a previous slot, or is a first symbol in the slot, or is a first symbol of a set of symbols in the slot allocated for the uplink data transmission.

In some examples, a relation between the identified symbol including the feedback information in the slot and the reference symbol is defined at the base station.

In some examples, the TDRA manager 1445 may be configured as or otherwise support a means for transmitting a time-domain resource allocation indicating a set of symbols in the slot allocated for the uplink data transmission, where identifying the symbol including the feedback information in the slot is based on the set of symbols in the slot allocated for the uplink data transmission.

In some examples, the symbol including the feedback information in the slot is a first symbol in the set of symbols allocated for the uplink data transmission.

In some examples, the feedback resource manager 1435 may be configured as or otherwise support a means for identifying a set of multiple options for identifying the symbol including the feedback information in the slot. In some examples, the feedback resource manager 1435 may be configured as or otherwise support a means for transmitting, to the UE in the downlink control information, an indication of an option of the set of multiple options for the UE to use to identify the symbol for transmission of the feedback information in the slot.

In some examples, the set of multiple options includes options for which reference symbol the UE is to use to identify the symbol for transmission of the feedback information in the slot.

In some examples, the feedback resource manager 1435 may be configured as or otherwise support a means for identifying one or more resource elements in the identified symbol including the feedback information based on a quantity of tones in a resource block allocated for the feedback information.

In some examples, to support identifying the symbol including the feedback information in the slot, the feedback resource manager 1435 may be configured as or otherwise support a means for identifying the symbol including the feedback information in the slot based on a size of a payload of the feedback information.

In some examples, the absence of the demodulation reference signal in the slot is due to the UE using demodulation reference signal bundling across the set of multiple slots.

Figure 15:
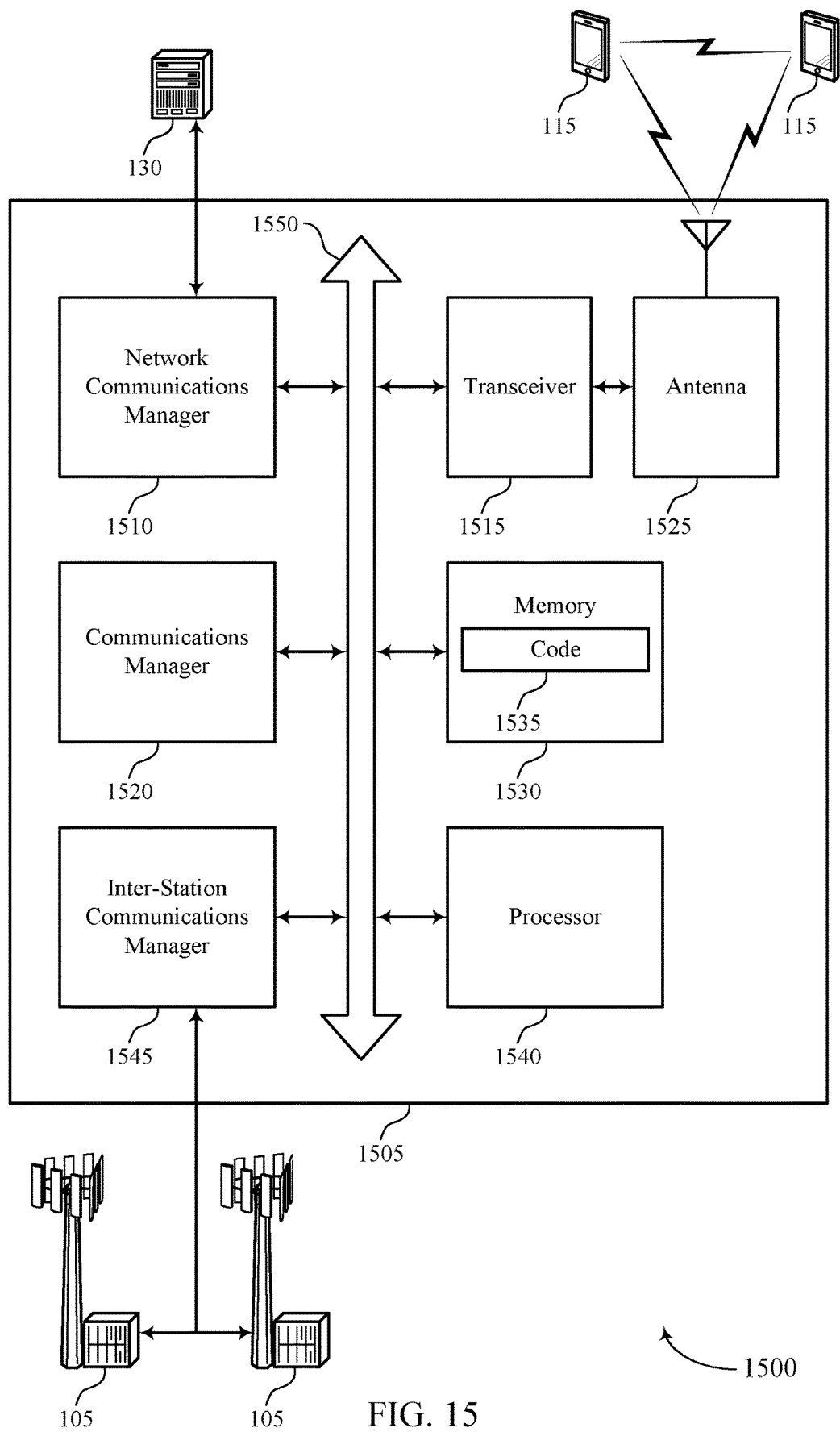
FIG. 15 shows a diagram of a system including a device that supports resources for uplink control information multiplexing in an absence of DMRSs in accordance with aspects of the present disclosure.

FIG. 15 shows a diagram of a system 1500 including a device 1505 that supports resources for uplink control information multiplexing in an absence of DMRSs in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting resources for uplink control information multiplexing in an absence of demodulation reference signals). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, downlink control information scheduling uplink data transmissions from the UE to the base station in a set of multiple slots. The communications manager 1520 may be configured as or otherwise support a means for receiving, from the UE, uplink control information including feedback information from the UE multiplexed with an uplink data transmission of the scheduled uplink data transmissions in a slot of the set of multiple slots. The communications manager 1520 may be configured as or otherwise support a means for identifying a symbol including the feedback information in the slot based on an absence of a demodulation reference signal in the slot. The communications manager 1520 may be configured as or otherwise support a means for decoding the feedback information in the identified symbol.

By including or configuring the communications manager 1520 in accordance with examples as described herein, the device 1505 may support techniques for more efficient utilization of communication resources. In particular, the techniques described herein may facilitate DMRS bundling or joint channel estimation across multiple slots where DMRSs may be absent in one or more slots of the multiple slots. Accordingly, a UE or a base station may use resources previously configured for DMRSs in the one or more slots to transmit data or control information, resulting in improved throughput and more efficient utilization of communication resources.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of resources for uplink control information multiplexing in an absence of DMRSs as described herein, or the processor 1540 and the memory 1530 may be otherwise configured to perform or support such operations.

Figure 16:
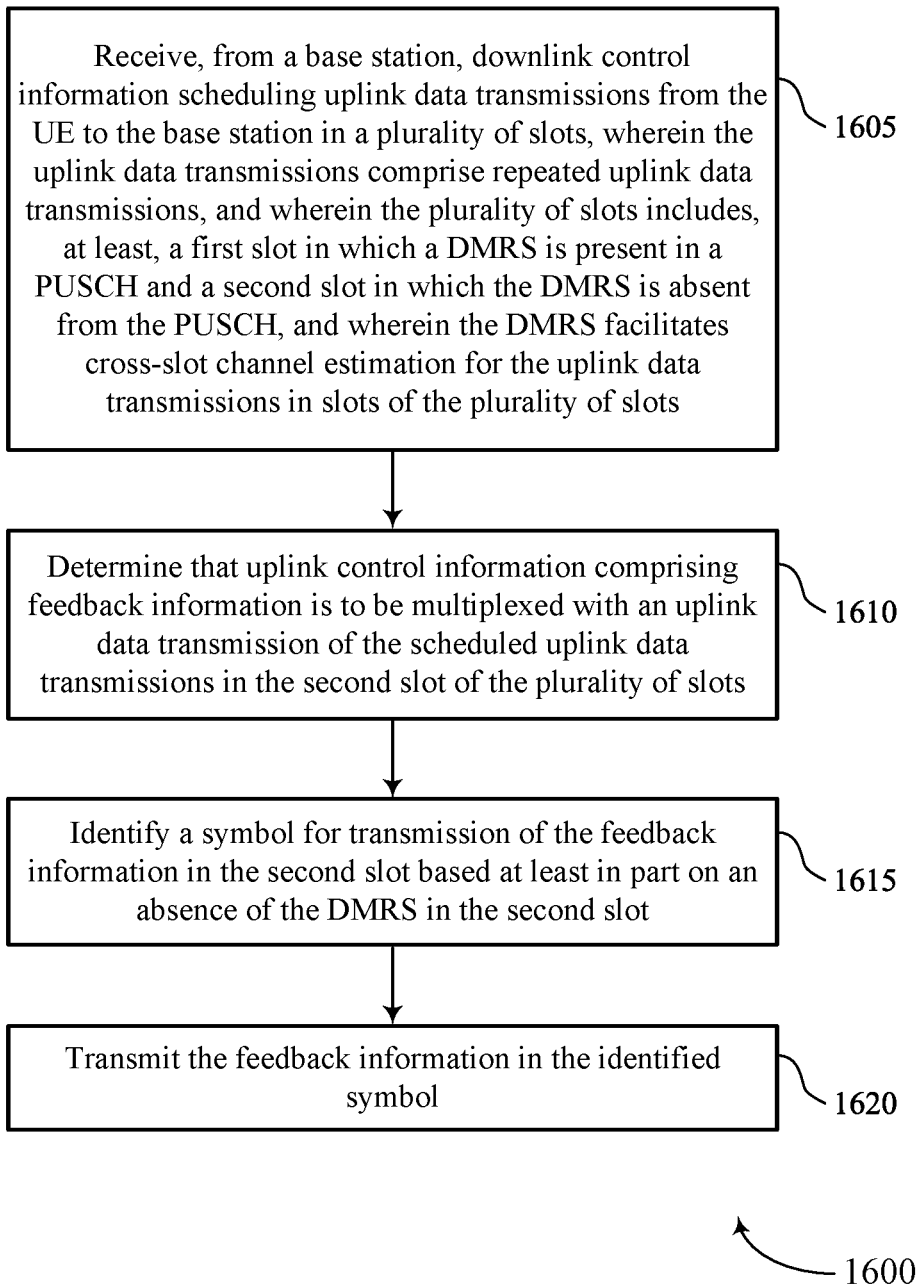
FIGS. 16 and 17 show flowcharts illustrating methods that support resources for uplink control information multiplexing in an absence of DMRSs in accordance with aspects of the present disclosure.

FIG. 16 shows a flowchart illustrating a method 1600 that supports resources for uplink control information multiplexing in an absence of DMRSs in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, downlink control information scheduling uplink data transmissions from the UE to the base station in a set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots. The operations of 1605 may be performed in accordance with examples as disclosed herein. In some examples, aspects of the operations of 1605 may be performed by a DCI manager 1025 as described with reference to FIG. 10.

At 1610, the method may include determining that uplink control information including feedback information is to be multiplexed with an uplink data transmission of the scheduled uplink data transmissions in the second slot of the plurality of slots. The operations of 1610 may be performed in accordance with examples as disclosed herein. In some examples, aspects of the operations of 1610 may be performed by a UCI manager 1030 as described with reference to FIG. 10.

At 1615, the method may include identifying a symbol for transmission of the feedback information in the second slot based on an absence of the DMRS in the second slot. The operations of 1615 may be performed in accordance with examples as disclosed herein. In some examples, aspects of the operations of 1615 may be performed by a feedback resource manager 1035 as described with reference to FIG. 10.

At 1620, the method may include transmitting the feedback information in the identified symbol. The operations of 1620 may be performed in accordance with examples as disclosed herein. In some examples, aspects of the operations of 1620 may be performed by a feedback information manager 1040 as described with reference to FIG. 10.

Figure 17:
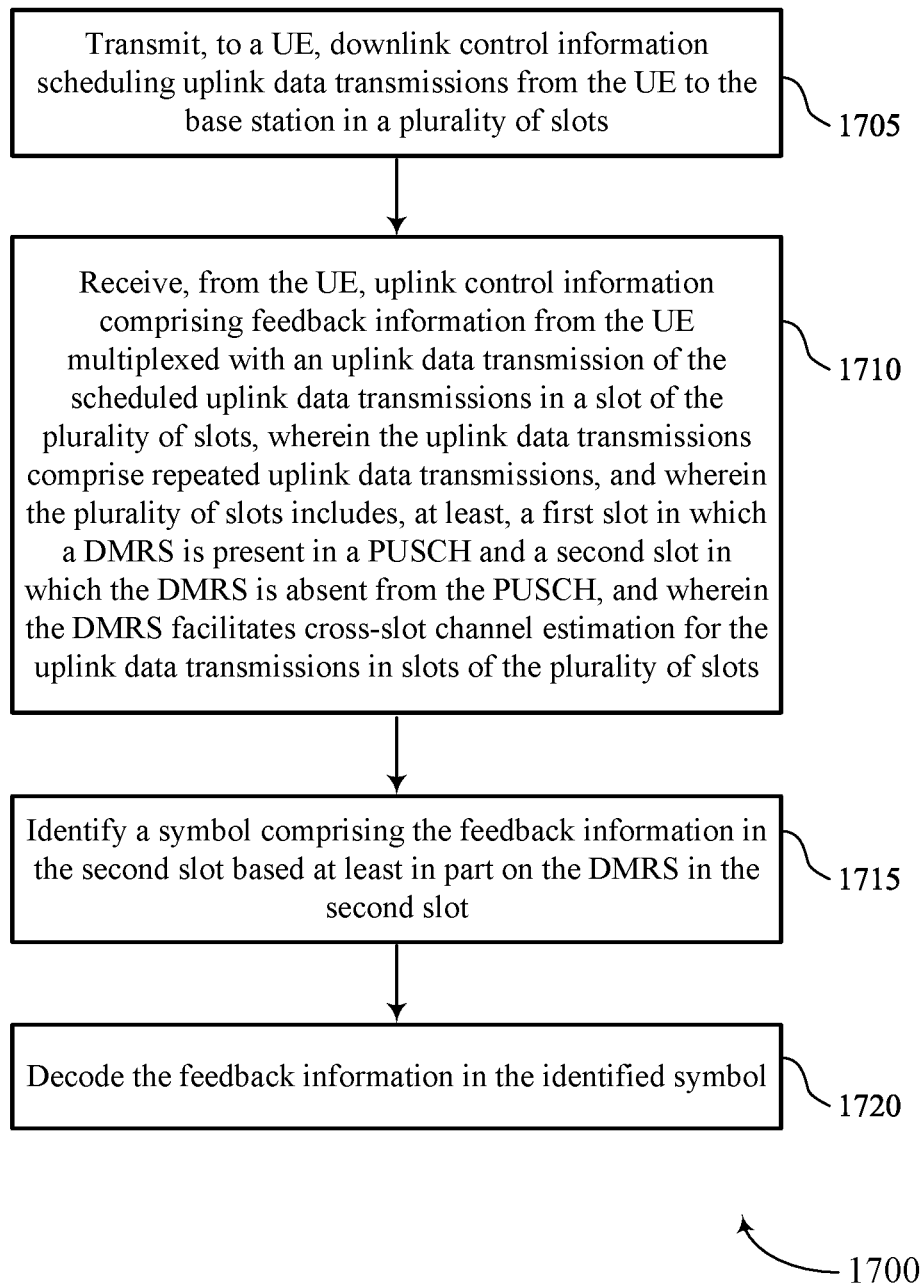

FIG. 17 shows a flowchart illustrating a method 1700 that supports resources for uplink control information multiplexing in an absence of DMRSs in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, downlink control information scheduling uplink data transmissions from the UE to the base station in a set of multiple slots. The operations of 1705 may be performed in accordance with examples as disclosed herein. In some examples, aspects of the operations of 1705 may be performed by a DCI manager 1425 as described with reference to FIG. 14.

At 1710, the method may include receiving, from the UE, uplink control information including feedback information from the UE multiplexed with an uplink data transmission of the scheduled uplink data transmissions in a slot of the set of multiple slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots. The operations of 1710 may be performed in accordance with examples as disclosed herein. In some examples, aspects of the operations of 1710 may be performed by a UCI manager 1430 as described with reference to FIG. 14.

At 1715, the method may include identifying a symbol including the feedback information in the second slot based on an absence of the DMRS in the second slot. The operations of 1715 may be performed in accordance with examples as disclosed herein. In some examples, aspects of the operations of 1715 may be performed by a feedback resource manager 1435 as described with reference to FIG. 14.

At 1720, the method may include decoding the feedback information in the identified symbol. The operations of 1720 may be performed in accordance with examples as disclosed herein. In some examples, aspects of the operations of 1720 may be performed by a decoder 1440 as described with reference to FIG. 14.

The following provides an overview of aspects of the present disclosure:

Aspect 1: A method for wireless communication at a UE, comprising: receiving, from a base station, downlink control information scheduling uplink data transmissions from the UE to the base station in a plurality of slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots; determining that uplink control information comprising feedback information is to be multiplexed with an uplink data transmission of the scheduled uplink data transmissions in the second slot of the plurality of slots; identifying a symbol for transmission of the feedback information in the second slot based at least in part on an absence of the DMRS in the second slot; and transmitting the feedback information in the identified symbol.

Aspect 2: The method of aspect 1, wherein identifying the symbol for transmission of the feedback information in the second slot comprises: identifying the symbol for transmission of the feedback information in the second slot based at least in part on a reference symbol.

Aspect 3: The method of aspect 2, wherein the reference symbol corresponds to a location of the DMRS in the first slot, or is in the location of the second slot that corresponds to a timing of the DMRS in the first slot, or is a first symbol in the second slot, or is a first symbol of a set of symbols in the second slot allocated for the uplink data transmission.

Aspect 4: The method of any of aspects 2 through 3, wherein a relation between the identified symbol for transmission of the feedback information in the second slot and the reference symbol is defined at the UE.

Aspect 5: The method of any of aspects 1 through 4, further comprising: receiving a time-domain resource allocation indicating a set of symbols in the second slot allocated for the uplink data transmission, wherein identifying the symbol for transmission of the feedback information in the second slot is based at least in part on the set of symbols in the second slot allocated for the uplink data transmission.

Aspect 6: The method of aspect 5, wherein the symbol identified for transmission of the feedback information in the second slot is a first symbol in the set of symbols allocated for the uplink data transmission.

Aspect 7: The method of any of aspects 1 through 6, further comprising: identifying a plurality of options for identifying the symbol for transmission of the feedback information in the second slot; and receiving, from the base station in the downlink control information, an indication of an option of the plurality of options to use for identifying the symbol for transmission of the feedback information in the second slot.

Aspect 8: The method of aspect 7, wherein the plurality of options comprises options for which reference symbol the UE is to use to identify the symbol for transmission of the feedback information in the second slot.

Aspect 9: The method of any of aspects 1 through 8, further comprising: identifying one or more resource elements in the identified symbol on which to transmit the feedback information based at least in part on a quantity of tones in a resource block allocated for transmitting the feedback information.

Aspect 10: The method of any of aspects 1 through 9, wherein identifying the symbol for transmission of the feedback information in the second slot comprises: identifying the symbol for transmission of the feedback information in the second slot based at least in part on a size of a payload of the feedback information.

Aspect 11: The method of any of aspects 1 through 10, wherein the absence of the demodulation reference signal in the second slot is due to the UE using demodulation reference signal bundling across the plurality of slots.

Aspect 12: The method of any of aspects 1 through 10, wherein the symbol for transmission of the feedback information differs between the first slot and the second slot.

Aspect 13: A method for wireless communication at a base station, comprising: transmitting, to a UE, downlink control information scheduling uplink data transmissions from the UE to the base station in a plurality of slots; receiving, from the UE, uplink control information comprising feedback information from the UE multiplexed with an uplink data transmission of the scheduled uplink data transmissions in a slot of the plurality of slots, wherein the uplink data transmissions comprise repeated uplink data transmissions, and wherein the plurality of slots includes, at least, a first slot in which a DMRS is present in a PUSCH and a second slot in which the DMRS is absent from the PUSCH, and wherein the DMRS facilitates cross-slot channel estimation for the uplink data transmissions in slots of the plurality of slots; identifying a symbol comprising the feedback information in the second slot based at least in part on an absence of the DMRS in the second slot; and decoding the feedback information in the identified symbol.

Aspect 14: The method of aspect 13, wherein identifying the symbol comprising the feedback information in the slot comprises: identifying the symbol comprising the feedback information in the second slot based at least in part on a reference symbol.

Aspect 15: The method of aspect 14, wherein the reference symbol corresponds to a location of the DMRS in the first slot, or is in the location of the second slot that corresponds to a timing of the DMRS in the first slot, or is a first symbol in the second slot, or is a first symbol of a set of symbols in the second slot allocated for the uplink data transmission.

Aspect 16: The method of any of aspects 14 through 15, wherein a relation between the identified symbol comprising the feedback information in the second slot and the reference symbol is defined at the base station.

Aspect 17: The method of any of aspects 13 through 16, further comprising: transmitting a time-domain resource allocation indicating a set of symbols in the second slot allocated for the uplink data transmission, wherein identifying the symbol comprising the feedback information in the second slot is based at least in part on the set of symbols in the second slot allocated for the uplink data transmission.

Aspect 18: The method of aspect 17, wherein the symbol comprising the feedback information in the second slot is a first symbol in the set of symbols allocated for the uplink data transmission.

Aspect 19: The method of any of aspects 13 through 18, further comprising: identifying a plurality of options for identifying the symbol comprising the feedback information in the second slot; and transmitting, to the UE in the downlink control information, an indication of an option of the plurality of options for the UE to use to identify the symbol for transmission of the feedback information in the second slot.

Aspect 20: The method of aspect 19, wherein the plurality of options comprises options for which reference symbol the UE is to use to identify the symbol for transmission of the feedback information in the second slot.

Aspect 21: The method of any of aspects 13 through 20, further comprising: identifying one or more resource elements in the identified symbol comprising the feedback information based at least in part on a quantity of tones in a resource block allocated for the feedback information.

Aspect 22: The method of any of aspects 13 through 21, wherein identifying the symbol comprising the feedback information in the second slot comprises: identifying the symbol comprising the feedback information in the second slot based at least in part on a size of a payload of the feedback information.

Aspect 23: The method of any of aspects 13 through 22, wherein the absence of the demodulation reference signal in the second slot is due to the UE using demodulation reference signal bundling across the plurality of slots.

Aspect 24: The method of any of aspects 13 through 22, wherein the symbol for transmission of the feedback information differs between the first slot and the second slot.

Aspect 25: An apparatus for wireless communication at a UE, comprising a processor; memory coupled with the processor; and instructions stored in the memory and executable by the processor to cause the apparatus to perform a method of any of aspects 1 through 11.

Aspect 26: An apparatus for wireless communication at a UE, comprising at least one means for performing a method of any of aspects 1 through 11.

Aspect 27: A non-transitory computer-readable medium storing code for wireless communication at a UE, the code comprising instructions executable by a processor to perform a method of any of aspects 1 through 11.

Aspect 28: An apparatus for wireless communication at a base station, comprising a processor; memory coupled with the processor; and instructions stored in the memory and executable by the processor to cause the apparatus to perform a method of any of aspects 13 through 23.

Aspect 29: An apparatus for wireless communication at a base station, comprising at least one means for performing a method of any of aspects 13 through 23.

Aspect 30: A non-transitory computer-readable medium storing code for wireless communication at a base station, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more processors;
memory coupled with the one or more processors; and
instructions stored in the memory and executable by the one or more processors to cause the apparatus to:
receive, from a network device, downlink control information scheduling uplink data transmissions from the UE to the network device in a plurality of slots, wherein the uplink data transmissions comprise repeated uplink data transmissions, and wherein the plurality of slots includes, at least, a first slot in which a demodulation reference signal (DMRS) is present in a physical uplink shared channel (PUSCH) and a second slot in which the DMRS is absent from the PUSCH, and wherein the DMRS facilitates cross-slot channel estimation for the uplink data transmissions in slots of the plurality of slots;
determine that uplink control information comprising feedback information is to be multiplexed with an uplink data transmission of the scheduled uplink data transmissions in the second slot of the plurality of slots;
identify a symbol for transmission of the feedback information in the second slot after determination of an absence of the DMRS in the second slot, wherein identifying the symbol is based at least in part on a reference symbol within the second slot, wherein a relation between the identified symbol for transmission of the feedback information in the second slot and the reference symbol is defined at the UE;
transmit the feedback information in the identified symbol; and
perform channel estimation for the uplink data transmissions using the DMRS across slots of the plurality of slots.

2. The apparatus of claim 1, wherein the reference symbol is in a location of the second slot that corresponds to a timing of the DMRS in the first slot, or is a first symbol in the second slot, or is a first symbol of a set of symbols in the second slot allocated for the uplink data transmission.

3. The apparatus of claim 1, wherein the instructions are further executable by the one or more processors to cause the apparatus to:
receive a time-domain resource allocation indicating a set of symbols in the second slot allocated for the uplink data transmission, wherein identifying the symbol for transmission of the feedback information in the second slot is based at least in part on the set of symbols in the second slot allocated for the uplink data transmission.

4. The apparatus of claim 3, wherein the symbol identified for transmission of the feedback information in the second slot is a first symbol in the set of symbols allocated for the uplink data transmission.

5. The apparatus of claim 1, wherein the instructions are further executable by the one or more processors to cause the apparatus to:
identify a plurality of options for identifying the symbol for transmission of the feedback information in the second slot; and
receive, from the network device in the downlink control information, an indication of an option of the plurality of options to use for identifying the symbol for transmission of the feedback information in the second slot.

6. The apparatus of claim 5, wherein the plurality of options comprises options for which reference symbol the UE is to use to identify the symbol for transmission of the feedback information in the second slot.

7. The apparatus of claim 1, wherein the instructions are further executable by the one or more processors to cause the apparatus to:
identify one or more resource elements in the identified symbol on which to transmit the feedback information based at least in part on a quantity of tones in a resource block allocated for transmitting the feedback information.

8. The apparatus of claim 1, wherein the instructions to identify the symbol for transmission of the feedback information in the second slot are executable by the one or more processors to cause the apparatus to:
identify the symbol for transmission of the feedback information in the second slot based at least in part on a size of a payload of the feedback information.

9. The apparatus of claim 1, wherein the absence of the DMRS in the second slot is due to the UE using DMRS bundling across the plurality of slots.

10. The apparatus of claim 1, wherein the identified symbol for transmission of the feedback information differs between the first slot and the second slot.

11. An apparatus for wireless communication at a network device, comprising:
one or more processors;
memory coupled with the one or more processors; and
instructions stored in the memory and executable by the one or more processors to cause the apparatus to:
transmit, to a user equipment (UE), downlink control information scheduling uplink data transmissions from the UE to the network device in a plurality of slots;
receive, from the UE, uplink control information comprising feedback information from the UE multiplexed with an uplink data transmission of the scheduled uplink data transmissions in a slot of the plurality of slots, wherein the uplink data transmission is received via repeated uplink data transmissions, and wherein the plurality of slots includes, at least, a first slot in which a demodulation reference signal (DMRS) is present in a physical uplink shared channel (PUSCH) and a second slot in which the DMRS is absent from the PUSCH, and wherein the DMRS facilitates cross-slot channel estimation for the uplink data transmissions in slots of the plurality of slots;
identify a symbol comprising the feedback information in the second slot based at least in part on an absence of the DMRS in the second slot, wherein the symbol comprising the feedback information is identified for reception by the network device based on the absence of the DMRS in the second slot, wherein identifying the symbol is based at least in part on a reference symbol within the second slot, wherein a relation between the identified symbol comprising the feedback information in the second slot and the reference symbol is defined at the network device; and
decode the feedback information in the identified symbol.

12. The apparatus of claim 11, wherein the reference symbol is in a location of the second slot that corresponds to a timing of the DMRS in the first slot, or is a first symbol in the second slot, or is a first symbol of a set of symbols in the second slot allocated for the uplink data transmission.

13. The apparatus of claim 11, wherein the instructions are further executable by the one or more processors to cause the apparatus to:

transmit a time-domain resource allocation indicating a set of symbols in the second slot allocated for the uplink data transmission, wherein identifying the symbol comprising the feedback information in the second slot is based at least in part on the set of symbols in the second slot allocated for the uplink data transmission.

14. The apparatus of claim 13, wherein the symbol comprising the feedback information in the second slot is a first symbol in the set of symbols allocated for the uplink data transmission.

15. The apparatus of claim 11, wherein the instructions are further executable by the one or more processors to cause the apparatus to:

identify a plurality of options for identifying the symbol comprising the feedback information in the second slot; and transmit, to the UE in the downlink control information, an indication of an option of the plurality of options for the UE to use to identify the symbol for transmission of the feedback information in the second slot.

16. The apparatus of claim 15, wherein the plurality of options comprises options for which reference symbol the UE is to use to identify the symbol for transmission of the feedback information in the second slot.

17. The apparatus of claim 11, wherein the instructions are further executable by the one or more processors to cause the apparatus to:

identify one or more resource elements in the identified symbol comprising the feedback information based at least in part on a quantity of tones in a resource block allocated for the feedback information.

18. The apparatus of claim 11, wherein the instructions to identify the symbol comprising the feedback information in the second slot are executable by the one or more processors to cause the apparatus to:

identify the symbol comprising the feedback information in the second slot based at least in part on a size of a payload of the feedback information.

19. The apparatus of claim 11, wherein the absence of the DMRS in the second slot is due to the UE using DMRS bundling across the plurality of slots.

20. The apparatus of claim 11, wherein the identified symbol for reception of the feedback information differs between the first slot and the second slot.

21. A method for wireless communication at a user equipment (UE), comprising:

receiving, from a network device, downlink control information scheduling uplink data transmissions from the UE to the network device in a plurality of slots, wherein the uplink data transmissions comprise repeated uplink data transmissions, and wherein the plurality of slots includes, at least, a first slot in which a demodulation reference signal (DMRS) is present in a physical uplink shared channel (PUSCH) and a second slot in which the DMRS is absent from the PUSCH, and wherein the DMRS facilitates cross-slot channel estimation for the uplink data transmissions in slots of the plurality of slots;

determining that uplink control information comprising feedback information is to be multiplexed with an uplink data transmission of the scheduled uplink data transmissions in the second slot of the plurality of slots;

identifying a symbol for transmission of the feedback information in the second slot after determination of an absence of the DMRS in the second slot, wherein identifying the symbol is based at least in part on a reference symbol within the second slot, wherein a relation between the identified symbol for transmission of the feedback information in the second slot and the reference symbol is defined at the UE;

transmitting the feedback information in the identified symbol; and performing channel estimation for the uplink data transmissions using the DMRS across slots of the plurality of slots.

22. The method of claim 21, wherein the reference symbol is in a location of the second slot that corresponds to a timing of the DMRS in the first slot, or is a first symbol in the second slot, or is a first symbol of a set of symbols in the second slot allocated for the uplink data transmission.

23. A method for wireless communication at a network device, comprising:

transmitting, to a user equipment (UE), downlink control information scheduling uplink data transmissions from the UE to the network device in a plurality of slots;

receiving, from the UE, uplink control information comprising feedback information from the UE multiplexed with an uplink data transmission of the scheduled uplink data transmissions in a slot of the plurality of slots, wherein the uplink data information is received via repeated uplink data transmissions, and wherein the plurality of slots includes, at least, a first slot in which a demodulation reference signal (DMRS) is present in a physical uplink shared channel (PUSCH) and a second slot in which the DMRS is absent from the PUSCH, and wherein the DMRS facilitates cross-slot channel estimation for the uplink data transmissions in slots of the plurality of slots;

identifying a symbol comprising the feedback information in the second slot based at least in part on an absence of the DMRS in the second slot, wherein the symbol comprising the feedback information is identified for reception by the network device based on the absence of the DMRS in the second slot, wherein identifying the symbol is based at least in part on a reference symbol within the second slot, wherein a relation between the identified symbol comprising the feedback information in the second slot and the reference symbol is defined at the network device; and decoding the feedback information in the identified symbol.

24. The method of claim 23, wherein the reference symbol is in a location of the second slot that corresponds to a timing of the DMRS in the first slot, or is a first symbol in the second slot, or is a first symbol of a set of symbols in the second slot allocated for the uplink data transmission.

* * * * *